United States Patent [19]
Bieback et al.

[11] Patent Number: 6,121,881
[45] Date of Patent: Sep. 19, 2000

[54] PROTECTIVE MASK COMMUNICATION DEVICES AND SYSTEMS FOR USE IN HAZARDOUS ENVIRONMENTS

[75] Inventors: John S. Bieback, Ellington; Peter J. LaPlaca, Vernon, both of Conn.; Fred Pulver, Northport, N.Y.

[73] Assignee: Safety Tech Industries, Inc., Vernon, Conn.

[21] Appl. No.: 09/126,554

[22] Filed: Jul. 31, 1998

Related U.S. Application Data

[63] Continuation-in-part of application No. 08/299,121, Sep. 2, 1994, abandoned.

[51] Int. Cl.[7] .................................................. G08B 21/00
[52] U.S. Cl. ..................... 340/573.1; 2/5; 128/204.23; 128/201.19; 340/521; 340/522; 381/376; 455/66; 455/90; 455/100
[58] Field of Search .............................. 340/573.1, 521, 340/522; 2/5; 128/201.19, 204.23; 381/376; 455/66, 100, 90

[56] References Cited

U.S. PATENT DOCUMENTS

| | | | |
|---|---|---|---|
| 2,123,196 | 7/1938 | Millard | 128/201.19 |
| 2,950,360 | 8/1960 | Duncan | 381/176 |
| 3,069,511 | 12/1962 | Rehman et al. | 379/430 |
| 3,267,414 | 8/1966 | Kritz | 367/94 |
| 4,072,831 | 2/1978 | Joscelyn | 381/367 |
| 4,130,803 | 12/1978 | Thompson | 455/344 |
| 4,152,553 | 5/1979 | White | 379/430 |
| 4,156,292 | 5/1979 | Helm et al. | 2/6.2 |
| 4,166,978 | 9/1979 | White et al. | 455/82 |
| 4,491,699 | 1/1985 | Walker | 379/174 |
| 4,718,415 | 1/1988 | Bolnberger et al. | 128/201.19 |
| 4,736,740 | 4/1988 | Parker et al. | 128/201.19 |
| 4,756,308 | 7/1988 | Ryback | 128/201.19 |
| 4,799,263 | 1/1989 | Banziger et al. | 381/94.1 |
| 4,813,025 | 3/1989 | Rowland et al. | 367/6 |
| 4,885,796 | 12/1989 | Loftus et al. | 455/11.1 |
| 4,957,106 | 9/1990 | Vandeputte | 128/201.19 |
| 4,961,420 | 10/1990 | Cappa et al. | 128/207.12 |
| 4,980,926 | 12/1990 | Noetzel | 455/41 |
| 5,060,308 | 10/1991 | Bieback | 359/154 |
| 5,080,092 | 1/1992 | Tenna | 128/201.19 |
| 5,138,666 | 8/1992 | Bauer et al. | 381/367 |
| 5,142,700 | 8/1992 | Reed | 455/344 |
| 5,157,378 | 10/1992 | Stumberg et al. | 340/521 |
| 5,159,641 | 10/1992 | Sopko et al. | 381/367 |
| 5,219,290 | 6/1993 | Lapp et al. | 434/226 |
| 5,224,473 | 7/1993 | Bloomfield | 128/201.19 |
| 5,224,474 | 7/1993 | Bloomfield | 128/201.19 |
| 5,279,286 | 1/1994 | Chen | 128/201.19 |

(List continued on next page.)

OTHER PUBLICATIONS

Voice Amplification and Two–way Radio Interface, Scott Aviation, 1990, pp. 1–3.
Sigma Radio Communication System, Survivair, 1994, pp. 1–2.
The ESP® Communications System for Firefighters, MSA, 1994, pp. 1–4.
Magnum Communication, International Safety Instruments, pp. 1–3.
Scott's New Wireless/Talk–Around, Scott, 1997, pp. 1–5.
Scott AV–2000 Voice Amplifier, Scott, 1996, pp. 1–2.
T–P.A.S.S.—Radio/Audio—Transmitting—Personal Alert Safety System, Grace Industries, Inc., pp. 1–2.
A Vital Link in a Hostile Environment, Golden West Communications, Inc., pp. 1–6.

*Primary Examiner*—Glen Swann
*Attorney, Agent, or Firm*—Fish & Richardson P.C.

[57] ABSTRACT

Protective mask communication systems are provided for use in hazardous environments, e.g., firefighting and hazardous waste clean-up operations. The systems allow wearers of protective masks working in a hazardous area to readily communicate both with each other and with personnel and automated systems outside of the area. Preferred systems provide short range radio communication between mask wearers.

38 Claims, 33 Drawing Sheets

6,121,881
Page 2

U.S. PATENT DOCUMENTS

| | | | |
|---|---|---|---|
| 5,307,793 | 5/1994 | Sinclair et al. | 128/201.19 |
| 5,319,711 | 6/1994 | Servi | 380/23 |
| 5,323,774 | 6/1994 | Fehlauer | 128/206.12 |
| 5,329,637 | 7/1994 | Walker | 2/5 |
| 5,371,804 | 12/1994 | Bauer | 381/367 |
| 5,385,141 | 1/1995 | Granatiero | 128/201.19 |
| 5,404,577 | 4/1995 | Zuckerman et al. | 455/66 |
| 5,428,688 | 6/1995 | Becker et al. | 381/344 |
| 5,433,612 | 7/1995 | Daku | 434/226 |
| 5,463,693 | 10/1995 | Birli et al. | 381/75 |
| 5,479,408 | 12/1995 | Will | 370/313 |
| 5,503,141 | 4/1996 | Kettl et al. | 128/201.19 |
| 5,515,419 | 5/1996 | Sheffer | 455/456 |
| 5,552,772 | 9/1996 | Janky et al. | 340/573.4 |
| 5,566,362 | 10/1996 | Bauer | 455/90 |
| 5,572,990 | 11/1996 | Berlin | 128/201.19 |
| 5,605,145 | 2/1997 | Hannah et al. | 128/201.19 |

Hartford Fire Department

June 29, 1998   Alarm: 12:34 a.m.   Arrive 12:39 a.m.
Weather: Overcast 64 F   Time Now 1:25 a.m.   Elapsed Time 0:51.

| Firefighter | Time In | Mask On | P.A.R. | P.A.S.S. | Temp |
|---|---|---|---|---|---|
| Bill Wilson | 1:09 | 16 | okay | okay | 196 |
| Bob Smith | 12:40 | 45 | okay | okay | 185 |
| Claude Balls | 12:41 | 44 | okay | okay | 201 |
| Harry Walsh | 12:44 | 41 | okay | okay | 225 |
| Stan Koslowski | 12:44 | 41 | okay | okay | 251 |
| Thomas Kelley | 12:46 | 39 | okay | okay | 185 |
| Sam Brown | 12:47 | 38 | okay | okay | 222 |
| Bob Brown | 12:52 | 33 | okay | okay | 295 |
| Jim Doyle | 12:55 | 30 | okay | okay | 238 |
| Ed Endee | 12:55 | 30 | okay | okay | 311 |
| Sam Malone | 12:55 | 30 | okay | okay | 318 |
| Bill Wilson | 1:09 | 16 | okay | okay | 196 |
| Jon Allan | 1:10 | 15 | okay | okay | 182 |

*FIG. 12*

Second Window

| Hartford Fire Department | | | |
|---|---|---|---|
| Type Address Here | Three Story | Brick | Commercial |
| Comments: | 12:40 | Arrived on scene, Flames shooting out of second floor front window. | |
| | 12:42 | Three men into building. | |
| | 12:44 | Woman screaming on third floor window. Called for aerial to move in. | |
| | 12:48 | Cox brought woman from third floor window. | |

*FIG. 12A*

PROTECTIVE MASK COMMUNICATION DEVICES AND SYSTEMS FOR USE IN HAZARDOUS ENVIRONMENTS

CROSS REFERENCE TO RELATED APPLICATIONS

This application is a continuation-in-part of U.S. Ser. No. 08/299,121, filed Sep. 2, 1994 now abandoned.

BACKGROUND OF THE INVENTION

The present invention relates to protective mask communication systems for use in hazardous environments, e.g., firefighting and hazardous waste clean-up operations.

Protective masks are often used to prevent emergency workers, such as firefighters, from inhaling smoke and/or toxic fumes. These masks typically include a self-contained breathing apparatus (SCBA), which provides a seal around the worker's face and a supply of air to allow the worker to breathe normally when exposed to smoke or fumes.

While such masks generally provide effective respiratory protection, they have typically tended to make it difficult for emergency personnel to hear each other. To allow the mask wearer to communicate, some masks have been provided with speakers and/or radio devices.

SUMMARY OF THE INVENTION

The present invention provides protective mask communication systems for use in hazardous environments, e.g., firefighting and hazardous waste clean-up operations. These systems allow wearers of protective masks working in a hazardous area to readily communicate both with each other and with personnel and automated systems outside of the area. Preferred systems provide short range radio communication between mask wearers. Allowing radio (rather than acoustic) communication between mask wearers is particularly valuable in noisy and distracting environments, e.g., fires, where team members have typically found it difficult to communicate while wearing masks.

Preferred systems also allow monitoring of the location and/or status of the mask wearers from outside of the hazardous area, for example by polling mask wearers to make sure that each mask wearer is conscious and able to respond. Some preferred systems also include a "homing" device that transmits a signal to enable rescuers to find a mask wearer in need of assistance. These features should reduce the incidence of deaths of emergency workers due to failure of rescuers to locate an injured or trapped worker.

In one aspect, the invention features a protective mask communication device including a housing constructed to be mounted on a protective mask, and, disposed within the housing, a microphone in acoustic communication with the interior of the mask, a transceiver constructed to transmit and receive relatively low power signals from another similar communication device located nearby, and to transmit and receive relatively higher power signals from a remote transceiver located relatively further away than the similar communication device, and circuitry constructed to process the signal received from the microphone and supply an input signal to the transceiver.

Preferred embodiments include one or more of the following features. The communication device further includes an actuator, external to the housing, constructed to be manually actuated by the mask wearer, and, within the housing, circuitry constructed to cause (a) the mask power to be turned on if the actuator is actuated when the power is off; and, each time that the actuator is actuated when the power is on: (b) an identification signal to be sent to the remote transceiver, identifying the mask wearer, and (c) the transmission of the relatively higher power signals to be activated. The actuator is a single button extending above an outer surface of the housing. The relatively higher power signals are transmitted to a repeater and then retransmitted by the repeater to the remote transceiver. The relatively low power and relatively higher power signals are transmitted on different channels. Transmission of the relatively low power signals is voice activated and transmission of the relatively higher power signals is manually activated. Manual activation causes an identification signal to be sent to the remote transceiver, identifying the mask wearer. The communication device further includes an actuator constructed to be moved by the mask wearer to manually activate the transmission of the relatively higher power signals, and the actuator also is constructed to turn on the power to the communication device. Turning the power on causes an identification signal to be sent to the remote transceiver, identifying the mask wearer.

In another aspect, the invention features a protective mask communication device including a housing constructed to be mounted on a protective mask, and, disposed within the housing, a microphone in acoustic communication with the interior of the mask, a speaker to amplify short-range acoustic communications, a transceiver to provide wireless radio frequency communication between the mask wearer and a remote receiver, and circuitry constructed to process the signal received from the microphone and supply an input signal to the transceiver.

Preferred embodiments include one or more of the following features. The communication device is constructed to transmit and receive both data and communication signals. The signals include a location signal transmitted from the communication device at predetermined intervals to assist in locating the mask wearer. The data signals include an evacuation signal transmitted to the communication device from the remote receiver.

In yet another aspect, the invention features a protective mask communication system for use in hazardous environments with a protective mask constructed to be worn over a person's face and to supply air to the wearer. The system includes a communication device mounted on the protective mask, including a transceiver to provide wireless radio frequency communication of data and communication signals between the mask wearer device and a remote receiver, and a command module including a polling device for sending a polling signal to the wearer and receiving a response to the polling signal from the wearer.

Preferred embodiments include one or more of the following features. The transceiver is constructed to transmit and receive relatively low power signals from another similar communication device located nearby, and to transmit the data and communication signals to and from the remote receiver at a relatively higher power. The relatively low power and relatively higher power signals are transmitted on different channels. The communication device includes an actuator constructed to be moved by the mask wearer to manually activate the transmission of the relatively higher power signals. The command module is constructed to recognize the manual activation as a response to the polling signal or, if no polling signal has been sent, as an indication that the mask wearer is conscious. The polling device is adapted to send one or more further polling signals if no response is received, and to provide an alarm signal to the command module if no response is received after the further polling signals. The polling device is adapted to determine the length of time elapsed since a polling signal was sent, and to send a further polling signal if no response has been received from the wearer after a predetermined period of time has elapsed. The command module is constructed to track the time elapsed since the communication device was turned on, and provide a visual display of this information. The system includes a plurality of communication devices, and the visual display includes a list of the names of wearers of the communication devices. The command module is adapted to provide an alarm, e.g., a visual or audible indication, if a communication device has been turned on for longer than a predetermined time. If a communication device has been turned on for greater than a predetermined time, the appearance of some or all of the information regarding the wearer of the communication device changes on the visual display. The change in appearance is a color change. The data signals sent by the communication device, and received by the command module, include data pertaining to the mask wearer's physical condition. The command module is constructed to transmit an evacuation signal to the communication device. The command module is constructed to remotely activate a homing signal to be transmitted by the communication device to assist in locating the wearer of the communication device. The system includes a hand-held transceiver to be used to track the homing signal and locate the mask wearer. The communication device is constructed to send, and the command module to receive, a "man down" signal when the mask wearer manually actuates an actuator external to the communication device.

The invention also features a protective mask communication system for use in firefighting including a mask constructed to supply air to the wearer and adapted for use inside a fire scene, and a communication device mounted on the mask including a transceiver constructed to transmit and receive relatively low power signals from another similar communication device.

Preferred embodiments include one or more of the following features. The device also includes a speaker and a microphone connected to the transceiver, the speaker, transceiver and microphone being contained in a housing as a single unit. The device further includes a speaker positioned adjacent the mask wearer's ear.

The invention further features a protective mask communication system for use in hazardous environments with a protective mask constructed to be worn over a person's face and to supply air to the wearer. The system includes a communication device mounted on the protective mask, including a transceiver to transmit and receive relatively low power signals from another similar communication device, and to provide wireless radio frequency communication, at a relatively higher power, of data and communication signals between the mask wearer device and a remote receiver, and a command module for communication of data and communication signals to and from the communication device at the relatively higher power.

Preferred embodiments include one or more of the following features. The relatively low power and relatively higher power signals are transmitted on different channels. The communication device includes an actuator constructed to be moved by the mask wearer to manually activate the transmission of the relatively higher power signals. The command module is constructed to track the time elapsed since the communication device was turned on, and provide a visual display of this information. The command module is further adapted to provide an alarm if the communication device has been turned on for longer than a predetermined time. The data signals sent by the communication device, and received by the command module, include data pertaining to the mask wearer's physical condition. The command module is constructed to transmit an evacuation signal to the communication device. The command module is constructed to remotely activate a homing signal to be transmitted by the communication device to assist in locating the wearer of the communication device. The system includes a hand-held transceiver to be used to track the homing signal and locate the mask wearer. The communication device is constructed to send, and the command module to receive, a "man down" signal when the mask wearer manually actuates an actuator external to the communication device. The command module includes a keyboard for manual entry of data.

The invention also features methods of using the protective mask communication systems described above.

Other features and advantages of the invention will be apparent from the description of the preferred embodiments, the drawings and the claims.

BRIEF DESCRIPTION OF THE DRAWINGS

FIG. 3 includes the mask shown in FIG. 1; the mask is omitted in FIG. 3a.

FIGS. 12 and 12a show schematic views of information displayed by the command consoles of FIGS. 11–11a.

DESCRIPTION OF THE PREFERRED EMBODIMENTS

The systems of the invention include several alternative preferred embodiments, which will be discussed separately below under appropriate headings.

Figure 1:
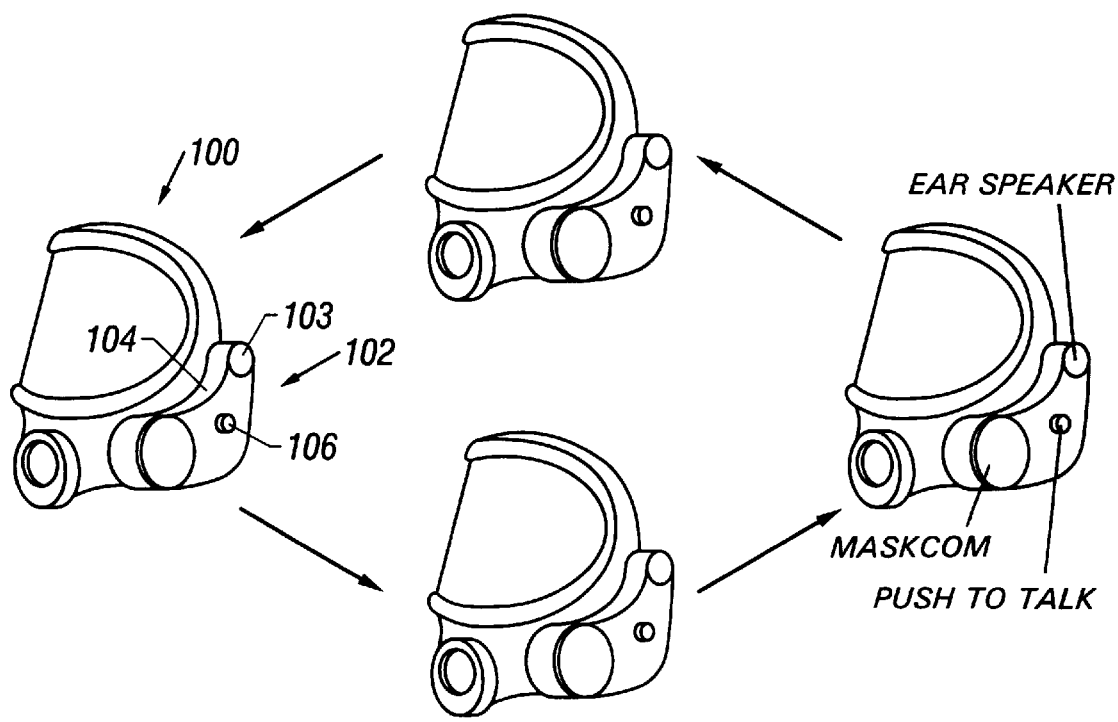
FIGS. 1 and 1a are schematic diagrams showing masks including a communication device according to one aspect of the invention, functioning in mask-to-mask mode and push-to-talk mode, respectively.
Figure 1A:
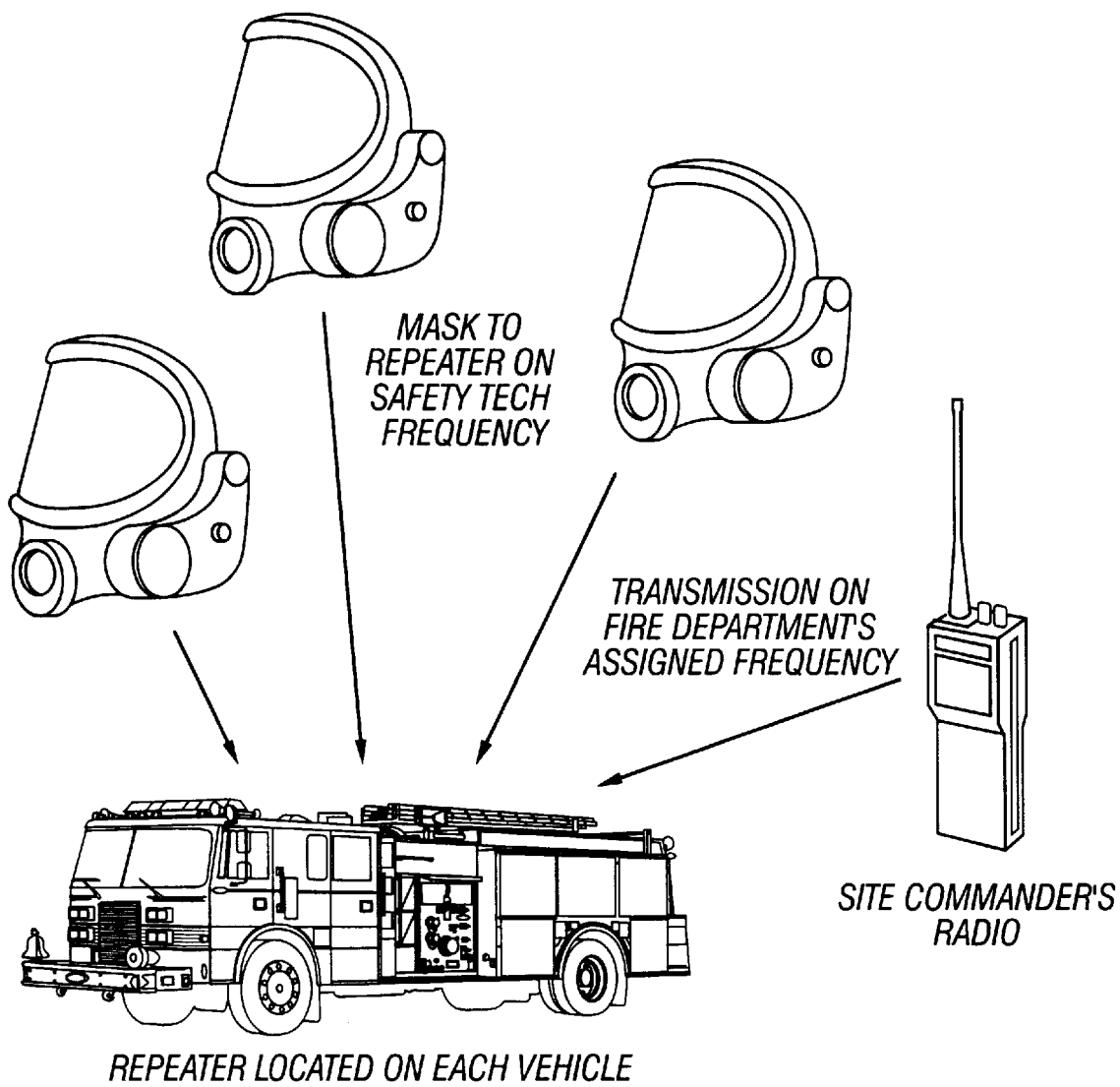

Mask with Radio Mask-to-Mask Communication on a First Channel and Radio Mask-to-Command Communication on a Second Channel In this embodiment, communication between mask wearers is via short range radio, and communication between a mask wearer and a remote location is also via radio, using a repeater (see FIGS. 1 and 1a). Because mask-to-mask communication does not rely upon acoustical transmission, wearers can easily communicate in a noisy or distracting environment such as a fire or other emergency scene Firefighters can also readily communicate with the site commander, or with a command module used by the site commander, as will be explained in detail below.

Communication Device Structure

Figure 2:
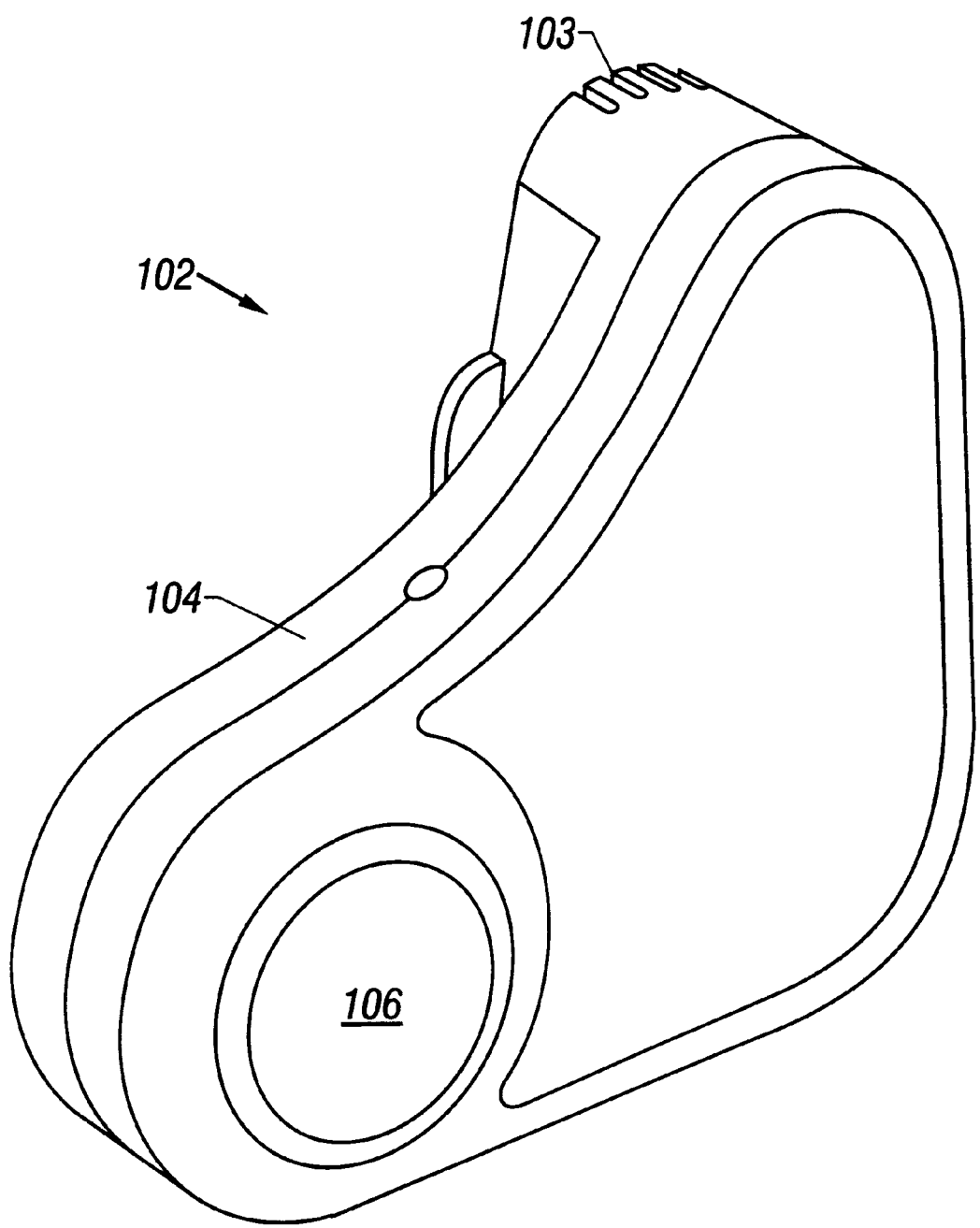
FIGS. 2 and 2a are perspective views of the communication device shown in FIG. 1, showing, respectively, the side of the device that faces out and the side of the device that faces the mask when the device is mounted on the mask.
Figure 2A:
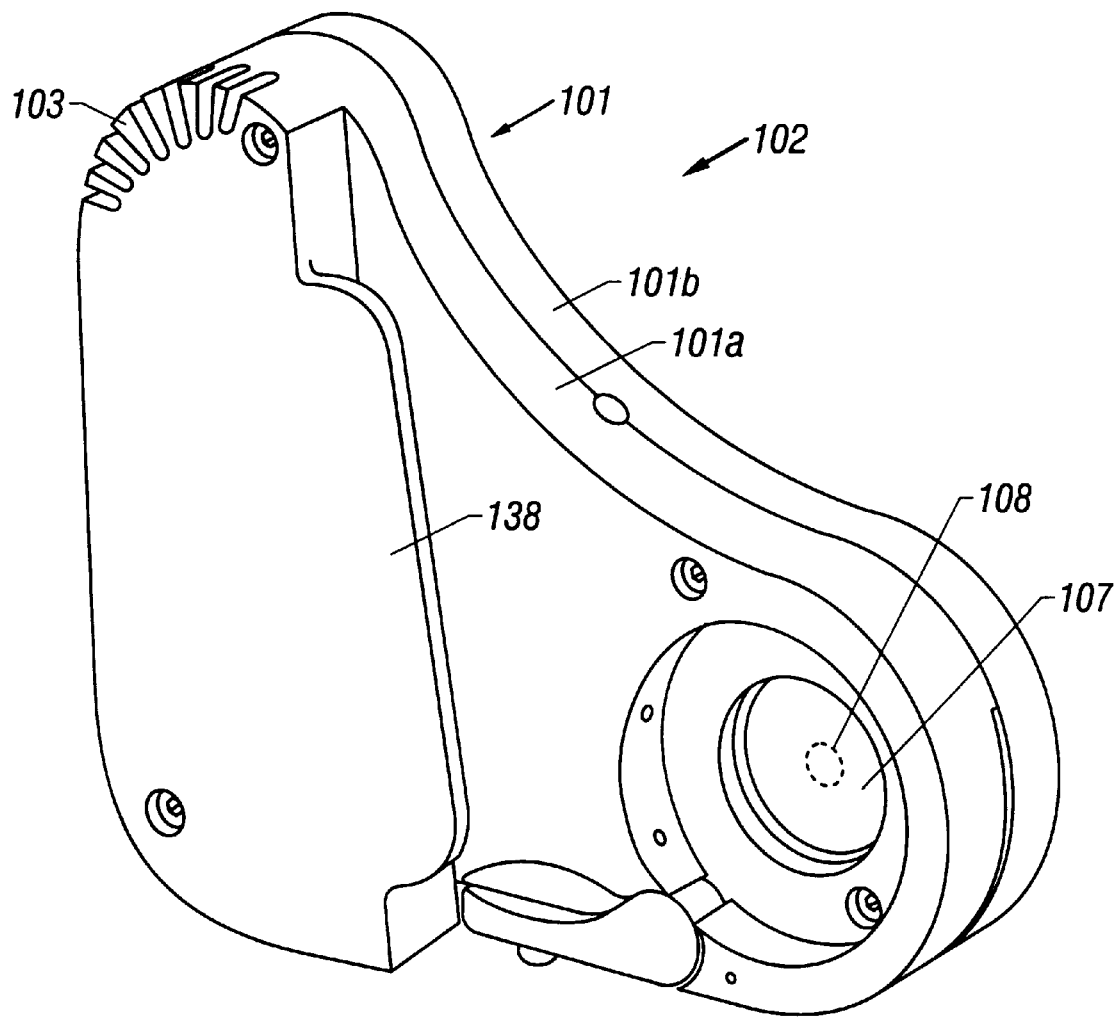
Figure 3:
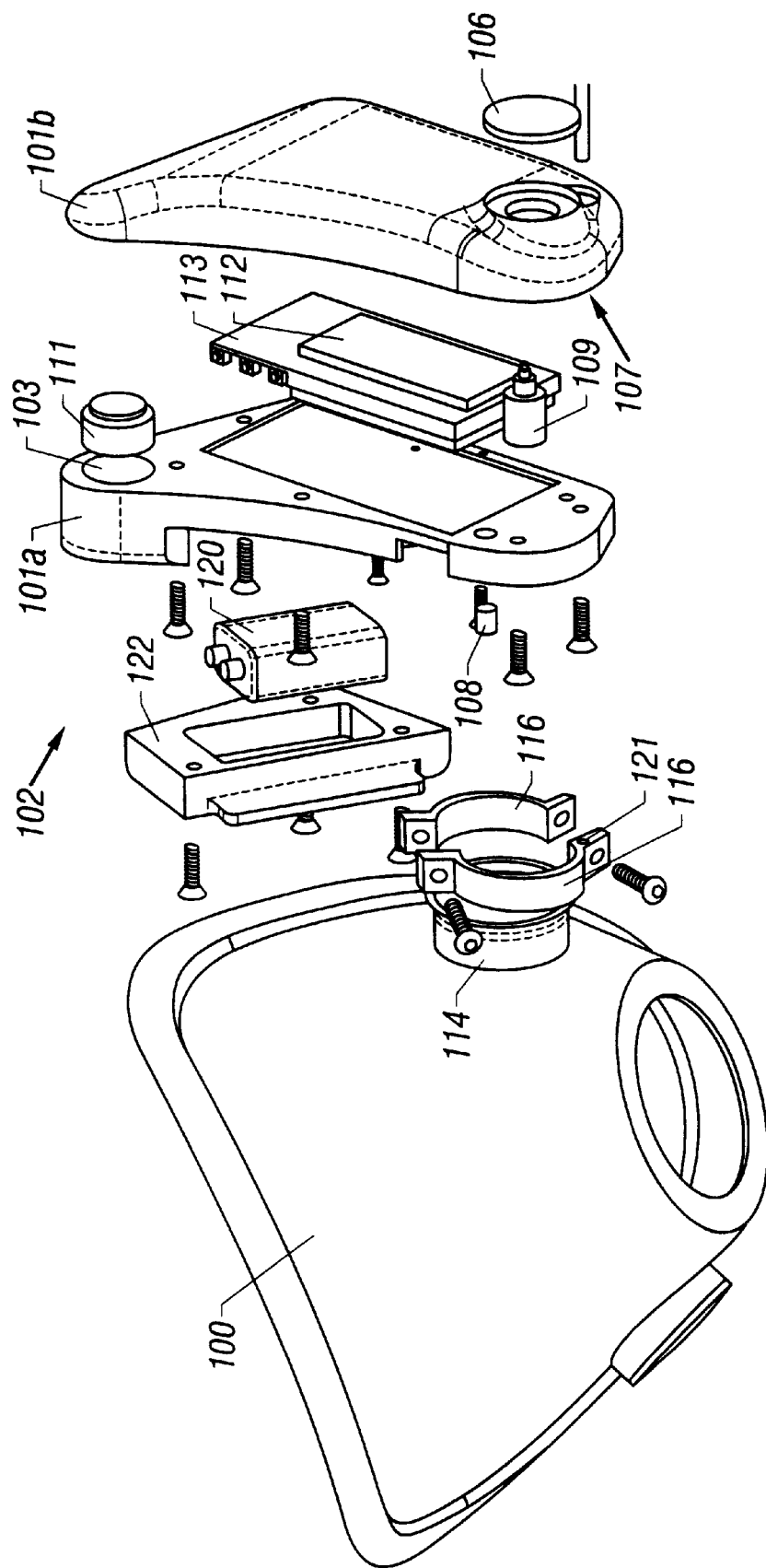
FIGS. 3 and 3a are exploded perspective views of the communication device shown in FIG. 2, taken from opposite sides.
Figure 3A:
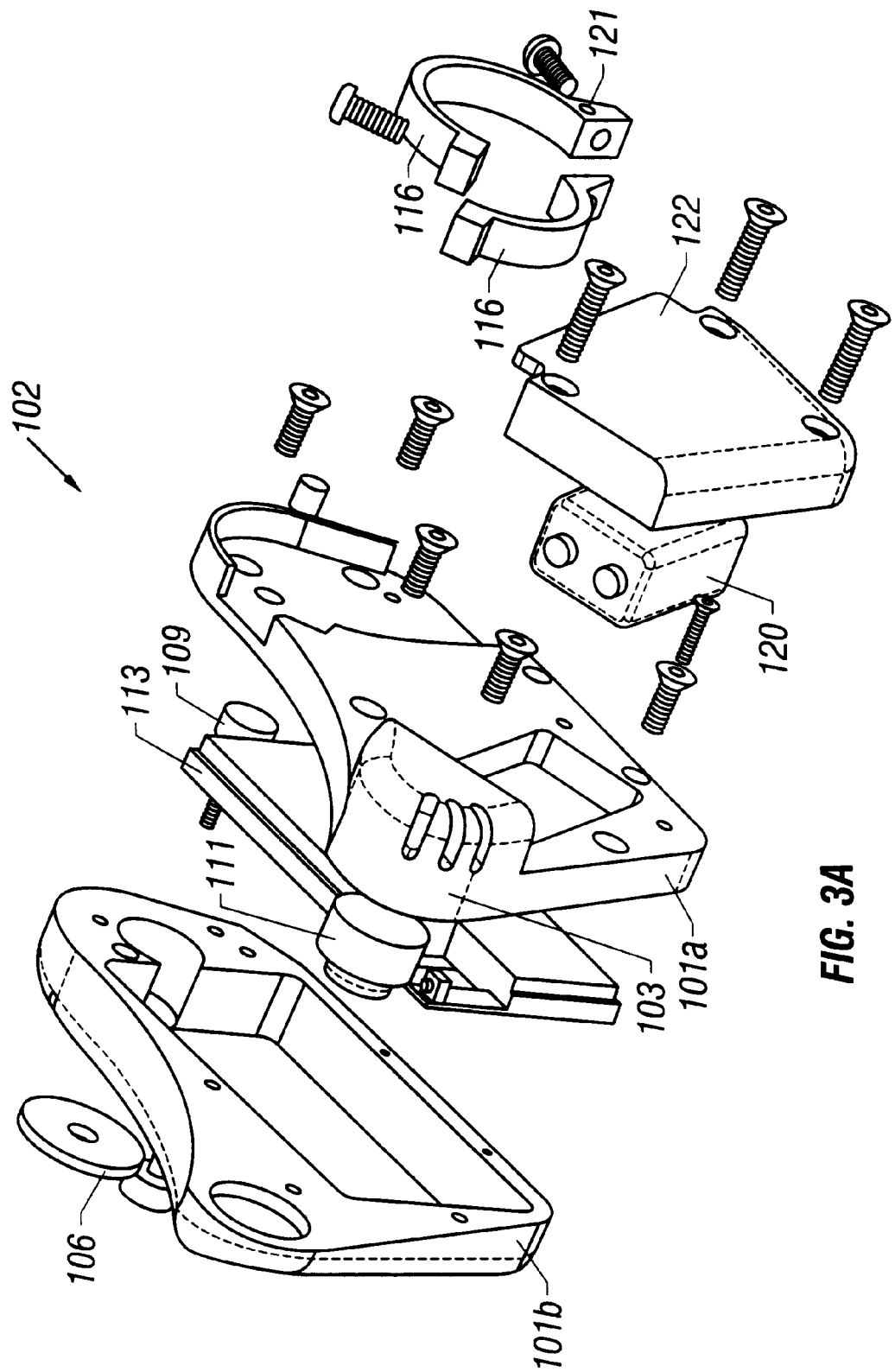

A mask 100 including a communication device 102 according to this embodiment of the invention is shown schematically in FIG. 1. Mask 100 may be any suitable firefighting mask, e.g., the SCBA masks that are discussed in further detail in the "Mask with Amplified Mask-to-Mask Communication" section, below. Communication device 102 includes a housing 101 having a curved upper edge 104, to reduce impairment of the wearer's peripheral vision by the communication device. Housing 101 consists of two opposed members 101a and 101b (FIGS. 3, 3A), that define a cavity that houses the components of the communication device. An ear piece 103, containing an ear speaker 111, is positioned immediately adjacent the wearer's ear for optimal sound reception. Adjacent the wearer's mouth, the communication device include a mouthpiece 107 containing a microphone 108 (FIGS. 2a and 3) into which the mask wearer can talk, which is connected to a transceiver 112 (part of circuit board 113, FIG. 3) for transmitting and receiving RF signals. Communication device 102 also includes a large, easily actuated button 106 (FIG. 2), which activates switch 109 (FIG. 3). Switch 109 provides two functions: (1) if the button is depressed and held down for a predetermined length of time, e.g., five seconds, the power to the mask is turned on (assuming that the mask was off prior to depression of the button); (2) during use, pressing the button activates the "push to talk" mode of the device 102, which will be discussed in detail below; and (3) "double-clicking" the button turns the power off and sends a signal to the command module indicating that the mask wearer has left the incident site. All of the circuitry for communication device 102 is mounted on circuit board 113 (FIGS. 3–3a).

Figure 4:
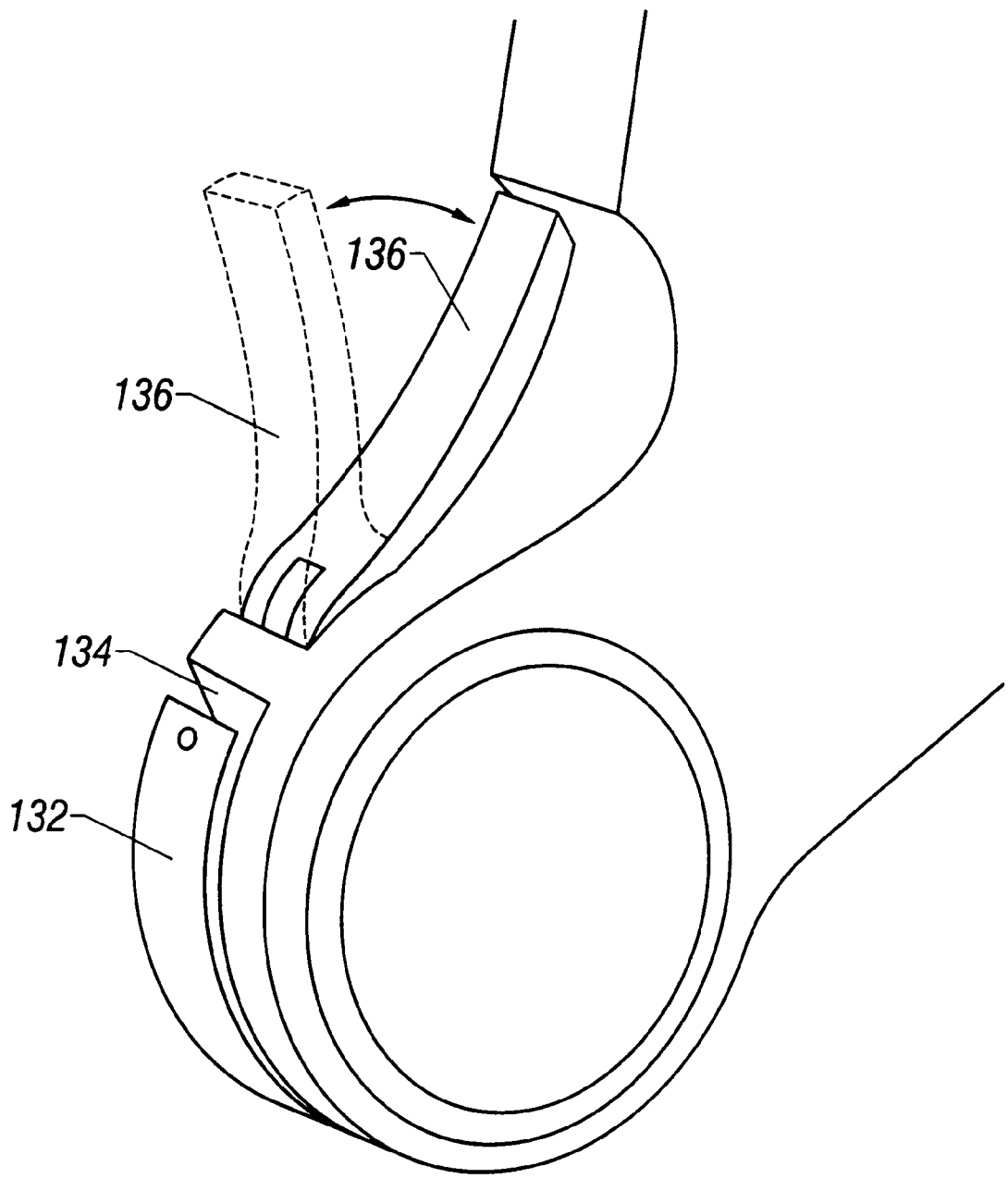
FIGS. 4 and 4a are perspective views, taken from opposite sides, of a portion of the communication device shown in FIG. 2, illustrating a preferred clamp for attaching the communication device to a mask.
Figure 4A:
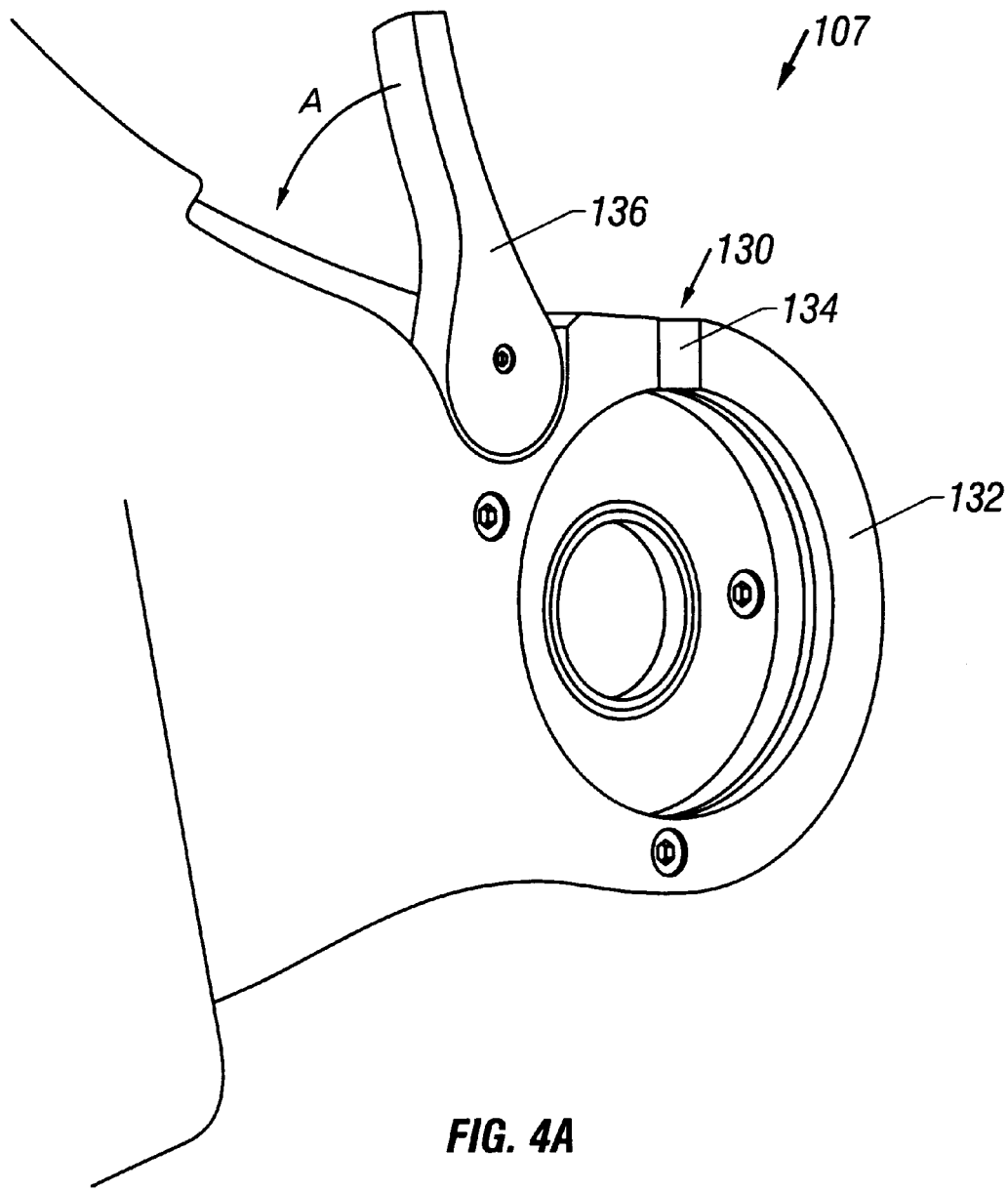

The communication device 102 can be secured to the mask in a number of different ways, two of which are shown in the Figures. For example, as shown in FIG. 3, the device 102 can be clamped onto the voicemitter 114 of mask 100 by a ring clamp 116, and locked in place by a threaded locking pin 118 which extends through a bore in the communication device and is threaded into aperture 121 in ring clamp 116. Alternatively, in the preferred embodiment shown in FIGS. 2–2A and, in more detail, in FIGS. 4–4A, the communication device 102 is locked in place by a camming device and a flexible ring. As shown in FIGS. 4–4A, the mouthpiece 107 of housing 101 includes a mounting ring 130 having a flexible portion 132, dimensioned to fit over the voicemitter 114 when the mounting ring is in the open position shown in FIG. 4A. Flexible portion 132 is mounted on the mouthpiece by a cam pin 134, connected to a camming lever 136. When the camming lever 136 is moved in the direction of Arrow A in FIG. 4A, the flexible portion 132 is drawn in that direction, as shown in FIG. 4, to the closed position shown in FIG. 2a. In the closed position, the mounting ring securely locks around voicemitter 114. The communication device can be easily removed by releasing the camming lever 136, as indicated by the phantom lines in FIG. 4. The engagement of the communication device with the mask is made more secure by connecting it to the mask at two points. The first point of connection is at the voicemitter. The second is at the side of mask frame. Flange 138 (FIG. 2A) is constructed to fit around the side of mask 100 and lock against a portion of the mask frame that extends beyond the rubber seal that seals the mask against the wearer's face.

Figure 5:
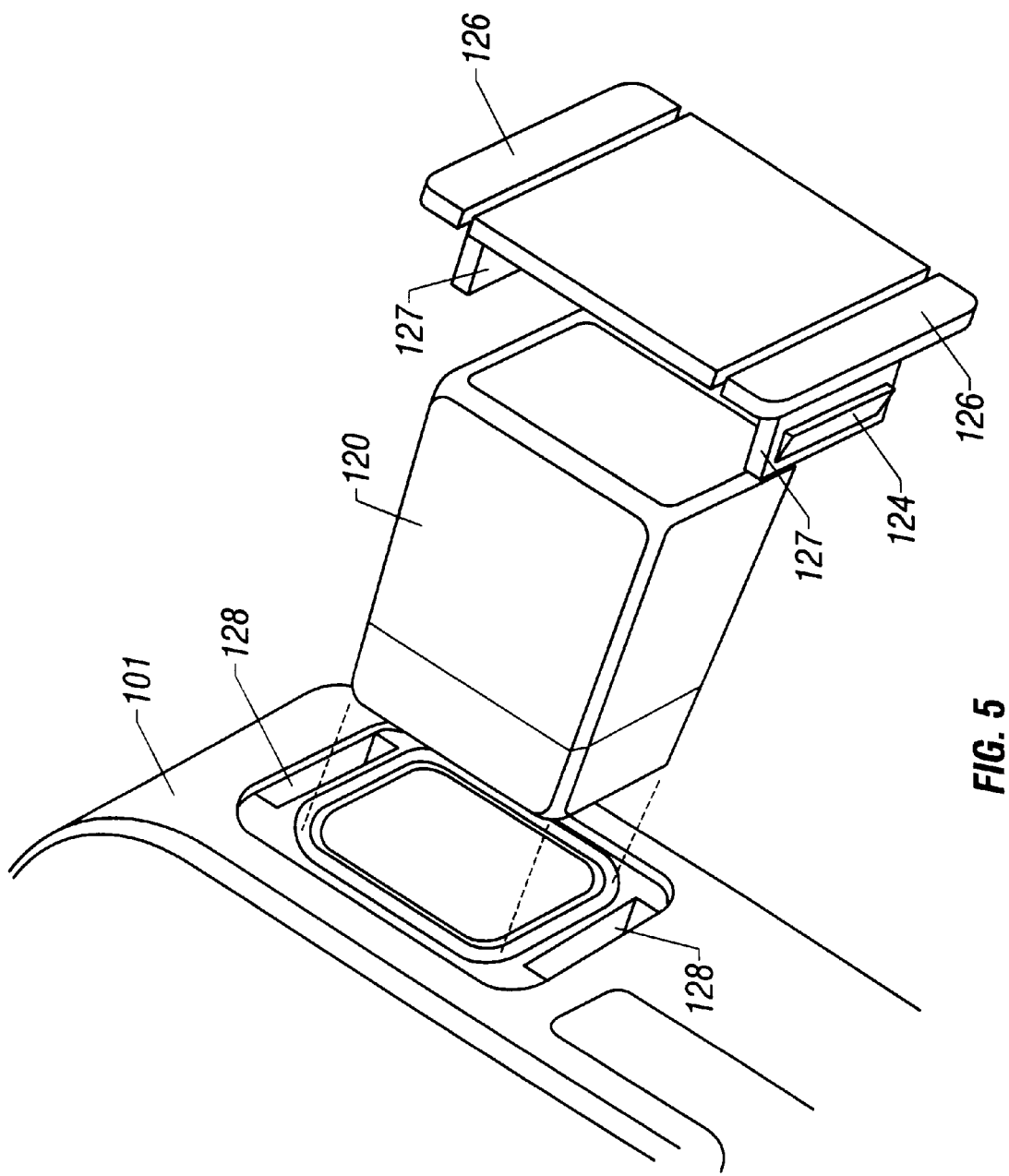
FIG. 5 shows an alternative battery holder for the communication device shown in FIG. 1.

The battery can be inserted into the device and held in place in various different ways. For example, as shown in FIGS. 3–3A, the battery 120 can be inserted into a cavity in the outside of housing member 101a, and held in place by a cover 122, which may be screwed or bolted on, as shown, or secured in any other suitable manner. However, it is preferred that the battery be readily accessible so that it can be easily changed. For example, as shown in FIG. 5, the battery can slide into a cavity in the housing 101, and be held in place by a snap-fit cover 124 having releasable side tabs 126 that protrude slightly above the surface of housing 101, to allow them to be easily grasped. Extending from the side tabs 126 are a pair of locking wings 127 that are constructed to slide into apertures 128 in housing 101 and to be released by squeezing the side tabs 126 together.

The safety features of the communication device 102 are discussed below in the "Mask Wearer Protection and Accountability Systems" section.

Voice Activated (VOX) Mask-to-Mask Communication

When the wearer talks into microphone 108 without having first actuated the "push to talk" button 106, the wearer's voice immediately triggers circuitry that activates voice-actuated short-range radio frequency (RF) communication between the mask wearer and other mask wearers. This circuitry is in the transceiver 112. This circuitry in turn activates transceiver 112. Transceiver 112 is connected to microphone 108 and ear speaker 110, and is constructed to transmit and receive audio transmissions at a power level of less than about 10 milliwatts (preferably less than 5 milliwatts, more preferably less than 1 milliwatt). Transmission at this power level generally gives a range of less than about 20 feet, preferably about 5–10 feet (assuming optimal conditions), and thus is adequate for most communications between mask wearers working in a particular area (as shown schematically in FIG. 1), while not being so strong as to interfere with communications between mask wearers in other areas of the site. Transceiver 112 is connected directly to the ear speaker 110.

Push-to-Talk (PTT) Mask-to-Remote Communication

If the mask wearer wishes to communicate with the command post or site commander, rather than with other mask wearers, the mask wearer depresses the "push to talk" button 106, actuating switch 109. This switches the transceiver to operate at higher power, allowing long range RF communication between the mask wearer and a remote location. Transceiver 112 is connected to the microphone 108 and speaker 110, and is constructed, when in PTT mode, to transmit and receive voice and data signals at a power level of about 700 milliwatts (providing a range adequate to reach the repeater under the site conditions, e.g., a range of about 800 feet under optimal conditions). (When in VOX mode, i.e., when the PTT button is not depressed, the transceiver 112 operates at a lower power level, as discussed above.)

Figure 8:
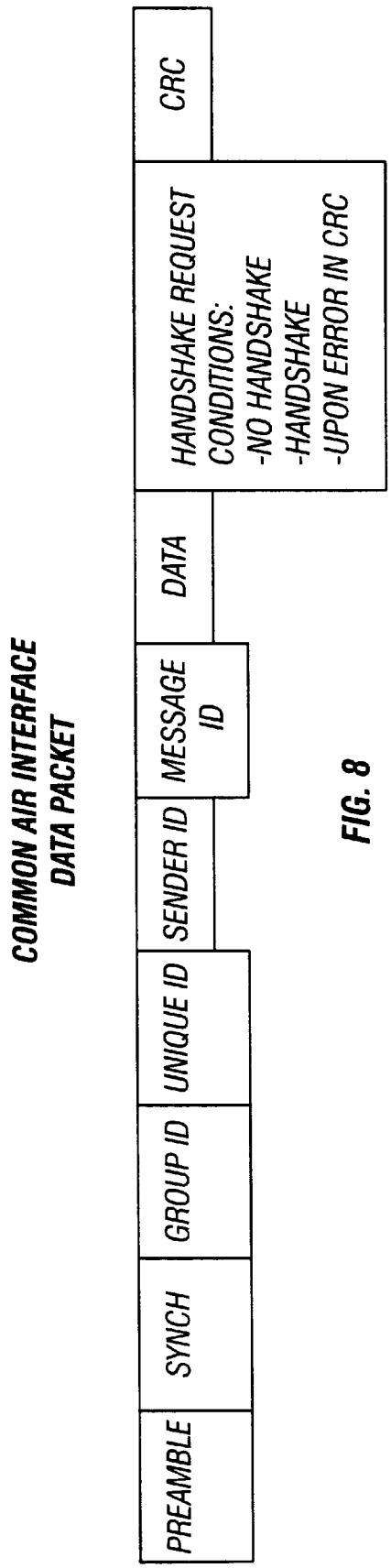
FIG. 8 is a diagram showing the components of a typical signal to be sent between a communication device and the command console.

Preferably, as soon as PTT communication is commenced, a digital signal identifying the mask wearer is sent by the transceiver (this also occurs when button 106 is first pushed to turn on the power to the mask). FIG. 8 illustrates a typical signal that would be sent from the mask to command or command to mask during PTT communication. The signal includes preamble, synch and CRC packets, used by the system hardware, as is well known in the electronics field. If the signal is sent by command, the signal also includes a group ID, indicating that the message is to be sent to all communication devices within the site (e.g., an evacuation message sent by command), or a unique ID, indicating that the message is to be sent to a particular communication device (e.g., from command to a particular mask wearer). These ID packets allow command to selectively send a signal to one or more, or all, of the mask wearers. All of the communication devices will initially receive the preamble and synch packets. Then, each of the communication devices are programmed to "listen" for the appropriate ID code for that communication device and for the group ID code. If a communication device "hears" a unique ID code that is not the code assigned to that device, the remainder of the message will be ignored; if it "hears" its own unique ID code or the group ID code it will "listen" to the remainder of the message. A sender ID packet is also included in the signal, identifying the sender of the message. The signal may also include a message ID to identify the message, e.g., by a message number. The data or voice signal follows the ID packets, and may be followed by a handshake request, asking the receiver to verify that the signal has been received.

The signals transmitted from the transceiver during PTT communication are received by a repeater (see FIG. 10), which is generally mounted on the fire truck at the incident site (if there are multiple repeaters at the site, the repeater that receives the signal at the greatest signal strength will be assigned to retransmit it, as is well known in the cellular communication field). Repeater 120 then retransmits the signals at a power level of about 10 watts to the site commander's radio and/or to a command module, discussed below.

Figure 6:
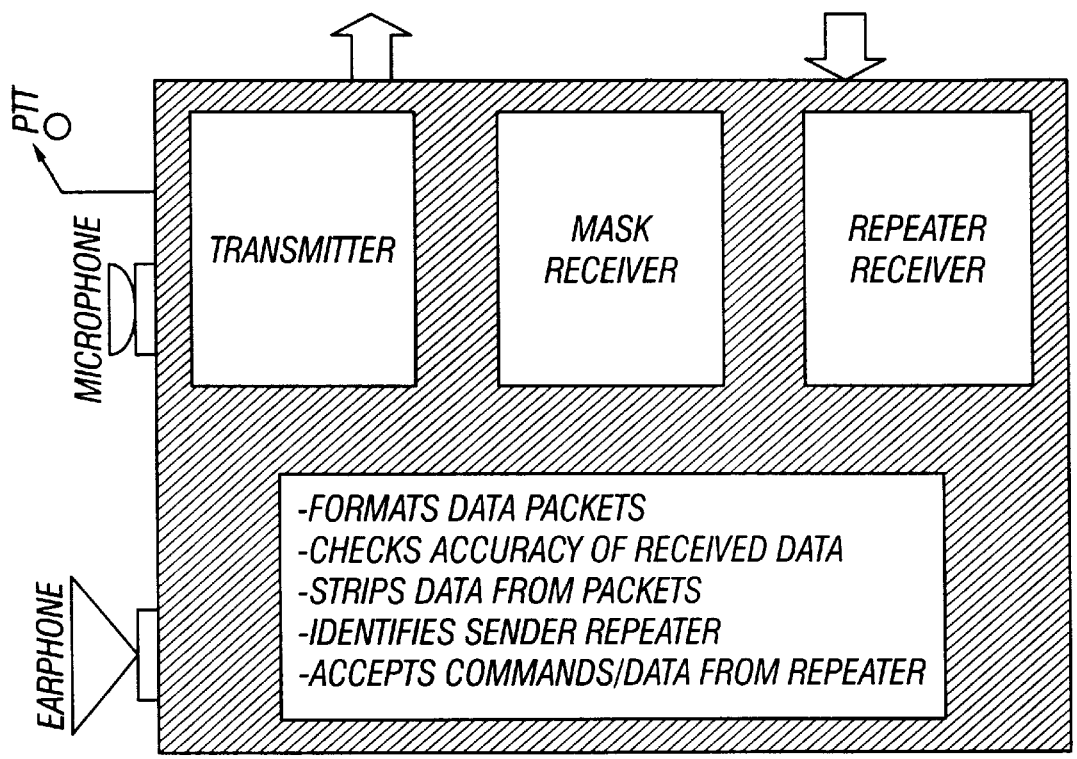
FIG. 6 is a block diagram of the communication device of FIG. 1.
Figure 7:
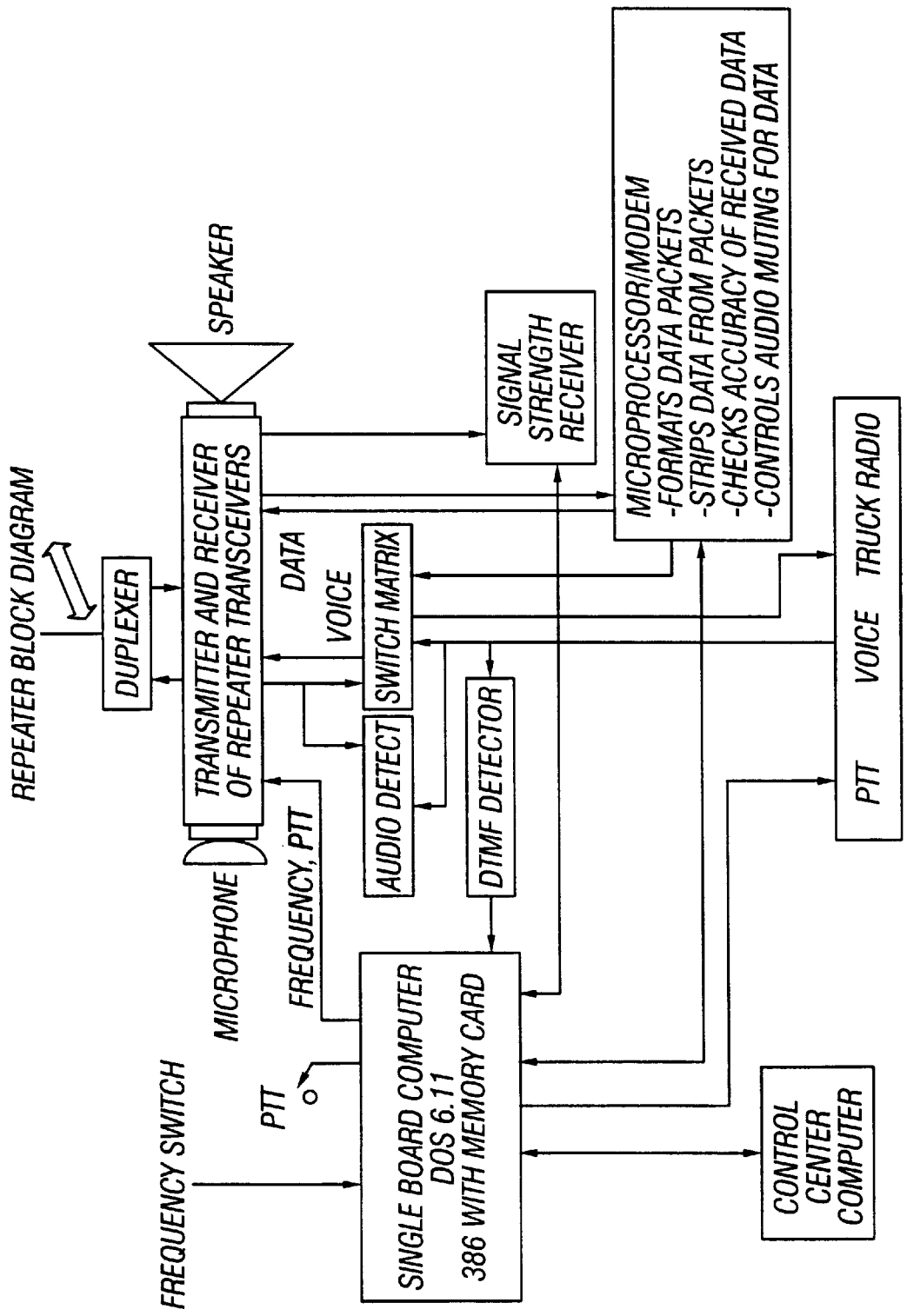
FIG. 7 is a block diagram of a repeater suitable for use with the communication device of FIG. 1.

These high power signals do not override mask-to-mask communication by other groups because the high power signals are on a different frequency from the mask-to-mask transmissions (and are received by a separate mask receiver and repeater receiver, as shown in FIG. 6). Thus, mask wearers can hear two or more voices at once through their ear speakers. The difference in frequency is preferably at least 5 megahertz.

Mask with Amplified Mask-to-Mask Communication and Radio Mask-to-Command Communication In an alternative embodiment, communications from one mask wearer to another are acoustical, amplified by an amplifier within the communication device, while communications from a mask wearer to a remote location, e.g., a command post or fire chief, are via radio. This embodiment is shown in FIGS. 13–20B, and discussed below with reference to these figures.

Communication Device Structure

Figure 13:
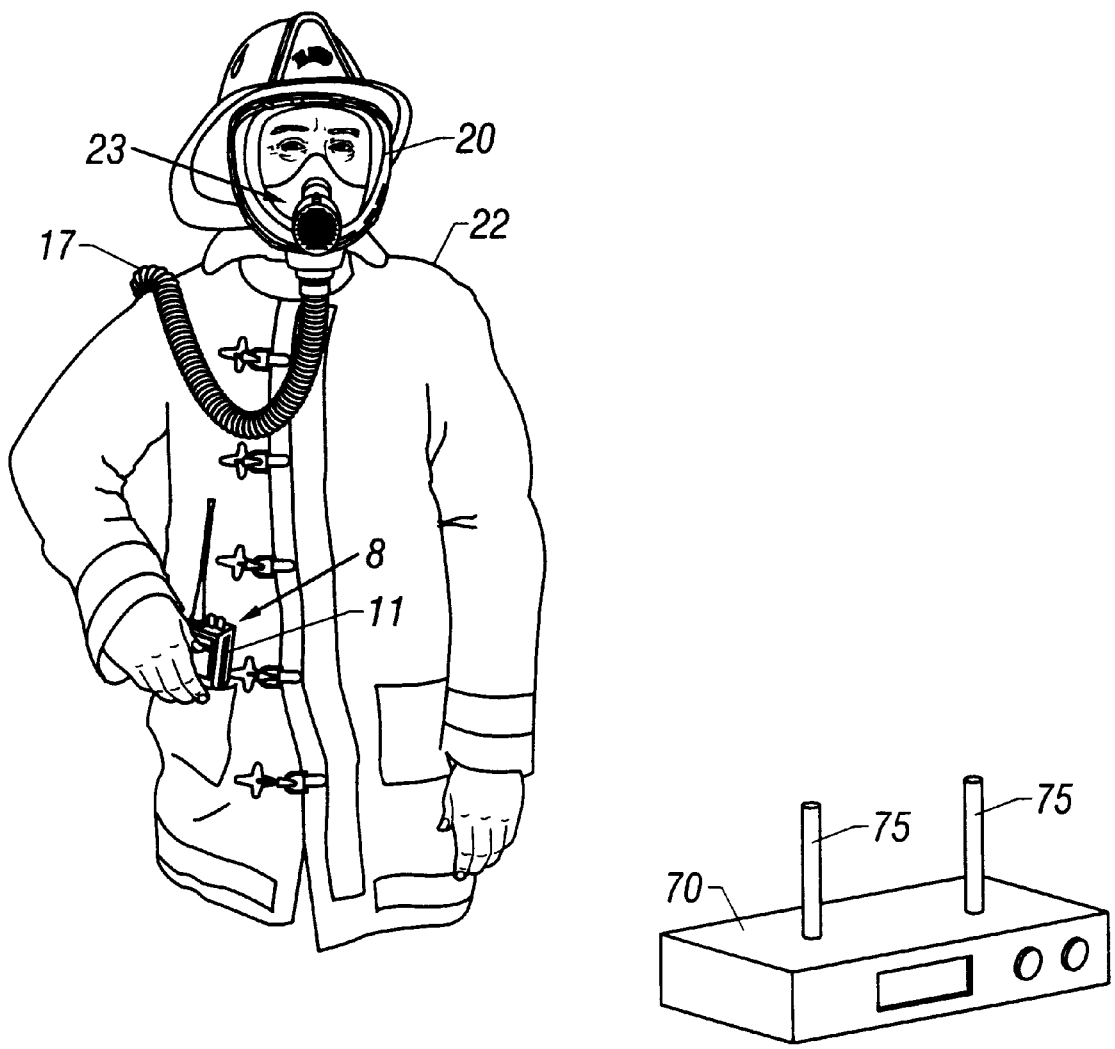
FIG. 13 is a schematic diagram of a firefighter utilizing a mask with a communication device according to an alternate embodiment of the invention.
Figure 14:
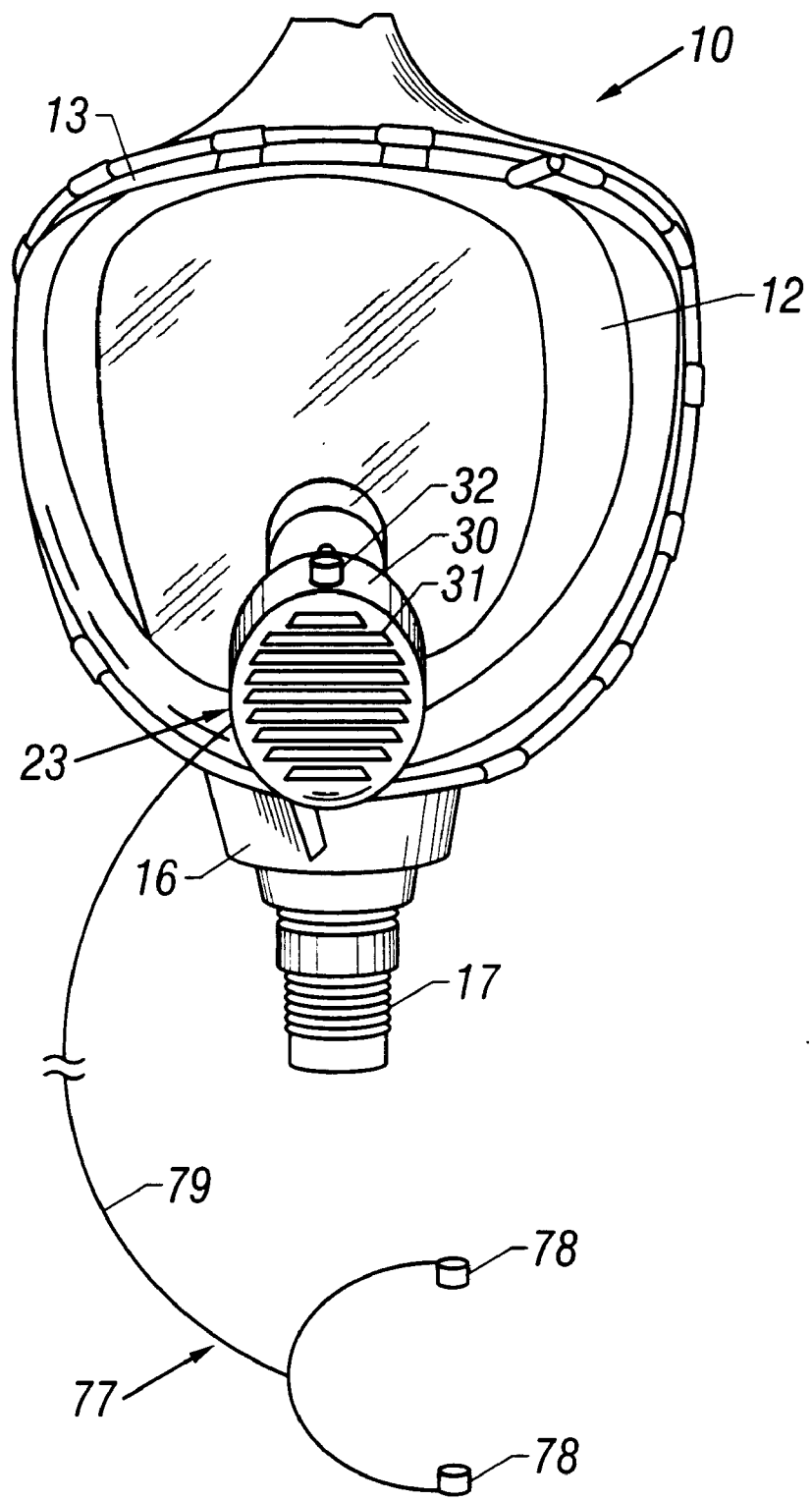
FIG. 14 is a front view of a mask with a communication device according to the embodiment shown in FIG. 13.

FIG. 14 shows a self-contained breathing apparatus (SCBA) mask 10, and, mounted on the mask, a communication device 23. The SCBA mask 10 includes a transparent lens 12 secured to a frame 13, and one or more straps for securing the mask to the head of a firefighter 22, as shown in FIG. 13. The frame 13 may be formed from a flexible impervious material such as rubber, plastic or other elastomeric material, contoured to closely conform to the face of a wearer. An extension 16 and air hose 17 provide a passageway for supplying air to the wearer. A suitable SCBA mask 10 is commercially available from Scott Aviation, Lancaster, N.Y., under the tradename "AV 2000".

Figure 15:
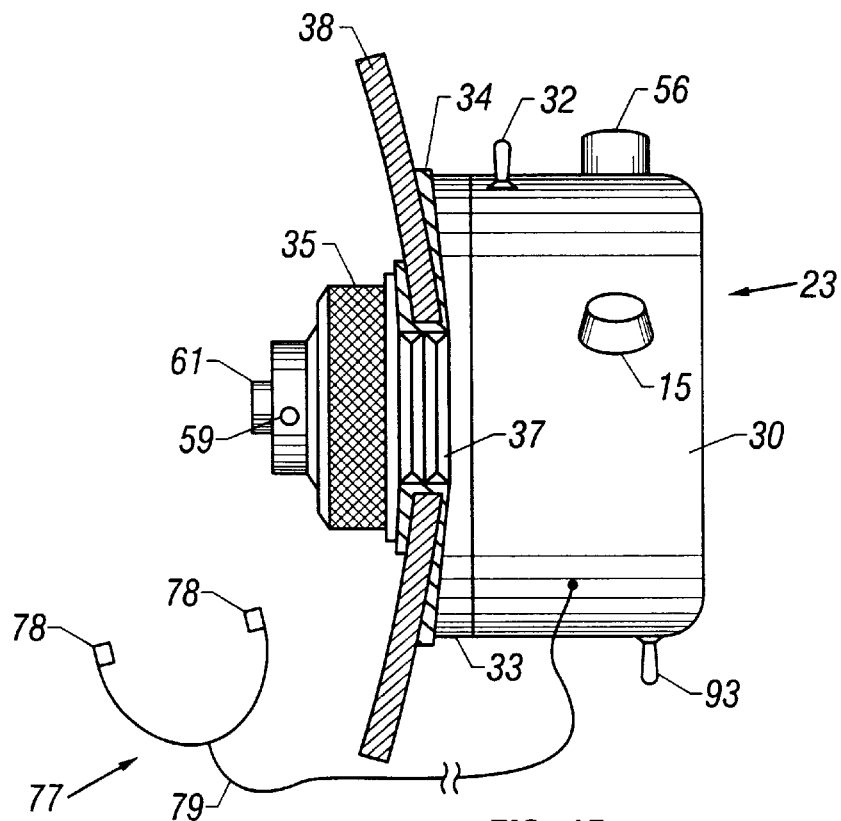
FIG. 15 and 15a are, respectively, a perspective side view and a sectional plan view of the communication device shown in FIG. 14.
Figure 15A:
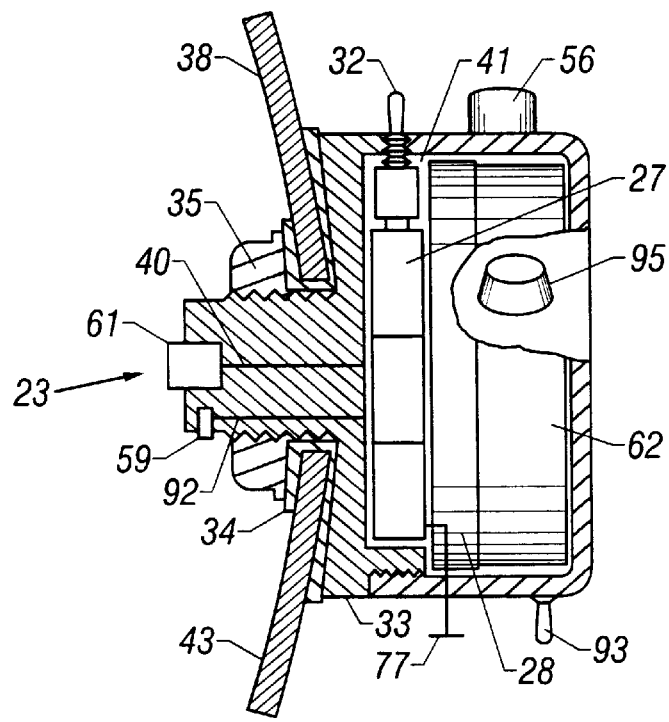
Figure 16:
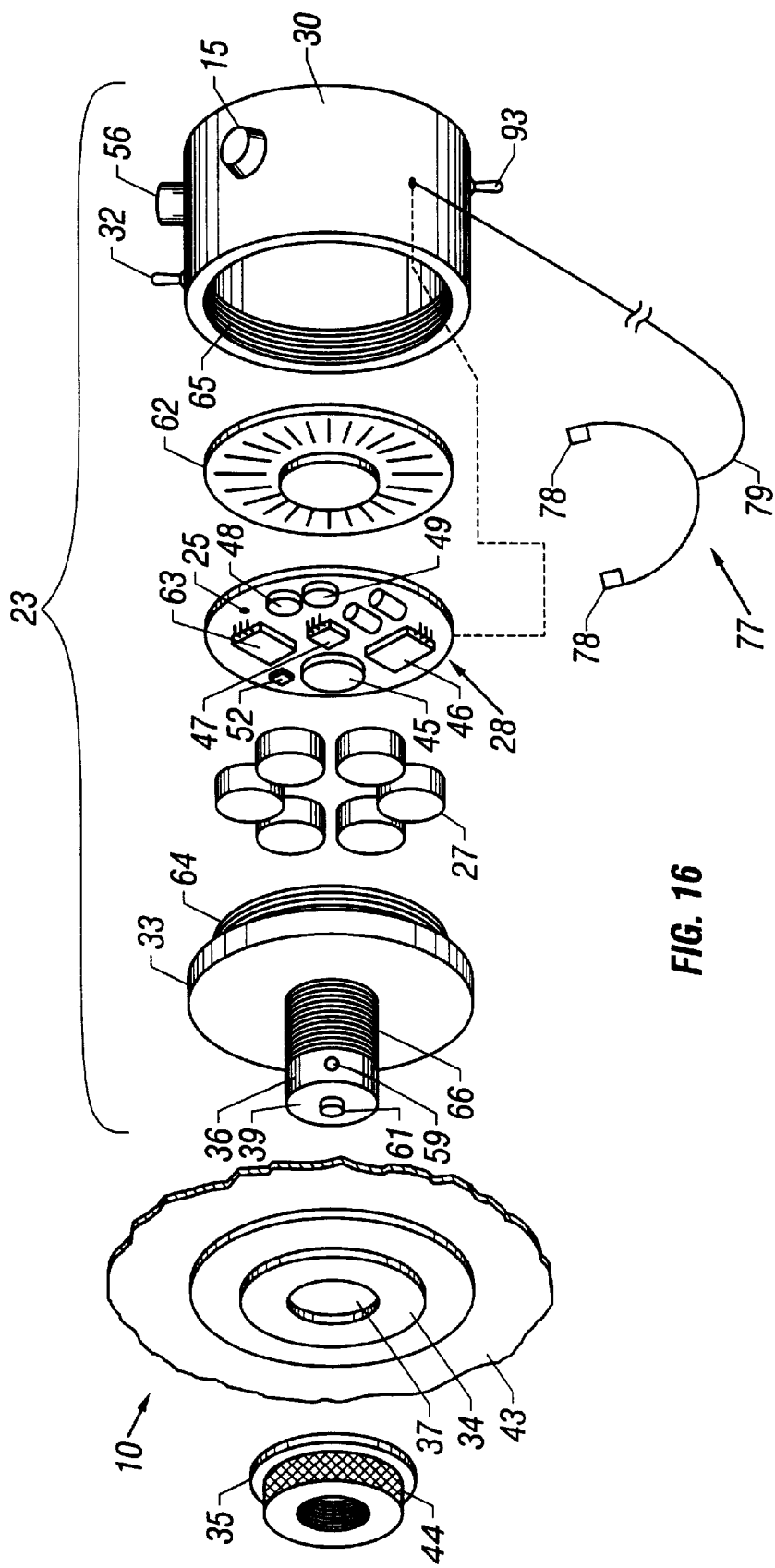
FIG. 16 is an exploded diagrammatic plan view of the communication device shown in FIG. 14.

As shown in FIGS. 15A and 16, communication device 23 includes a microphone 61 extending into mask 20, and, outside of mask 20, a housing 30 containing a speaker 62, and an integrated electronics package 28. Electronics package 28 includes a transceiver 63, which is constructed to transmit from the mask to a portable transceiver 11 (included in a radio 8 carried on the firefighter's belt (FIG. 13), and amplifier electronics.

Portable transceiver 11 is created by attaching a radio receiver (electronics shown in FIG. 20B) to a standard portable transceiver. This circuit picks up, via pick-up coil 94, and causes the portable transceiver 11 to transmit the voice signal 90 in an amplified strength to command unit 70.

Figure 20:
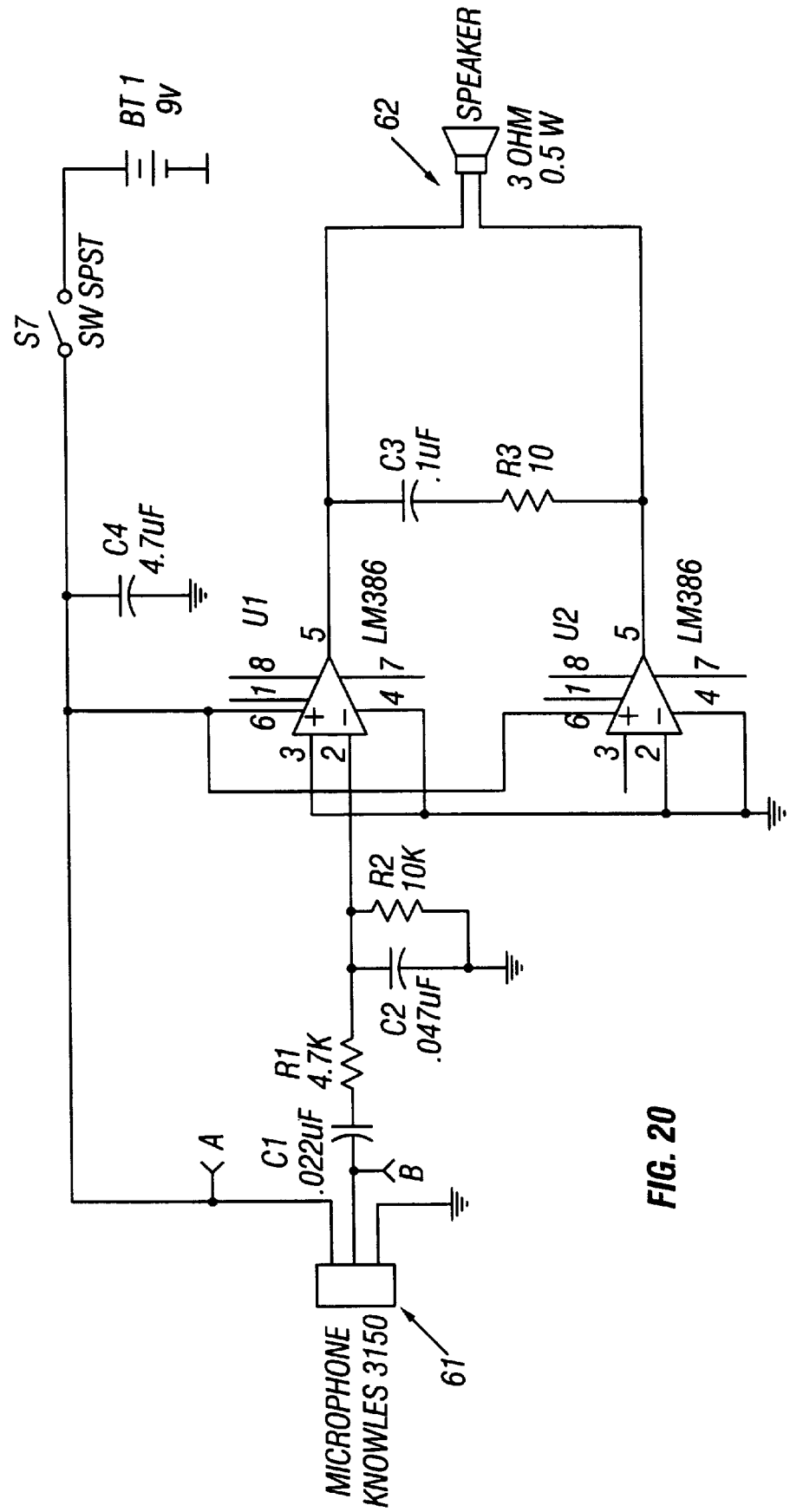
FIGS. 20, 20a and 20b are circuit diagrams showing suitable circuitry for, respectively, a mask amplifier, radio link circuitry, and radio receiver circuitry, to be used in the communication device shown in FIG. 14.

The circuit diagram for the amplifier electronics is shown in FIG. 20. The amplifier circuitry is connected to microphone 61 and to speaker 62. The amplifier circuitry is designed to amplify the output of microphone 61, and contains noise suppressing circuitry. The amplified voice signal is coupled to speaker 62 to provide a relatively clear and loud speech output from speaker 62.

The microphone 61 is secured at one end 39 of neck 36 (FIG. 16). As shown in FIG. 15A, microphone 61 is connected, via lead 40, to the amplifier electronics, and to speaker 62. Preferably the microphone 61 is of a noise-cancelling type to reduce noise from the mask wearer's breathing. A suitable microphone is a Knowles 3150 Unit.

The speaker 62 generally has a tubular shape of relatively small diameter, e.g., from 0.5 to 2 inches, and a length of from about 1 to 1.5 inches. The outwardly facing surface of the speaker 62 is perforated with holes 31 (FIG. 14) to enable the speaker's voice to emanate therefrom. The speaker 62 may include a piezoelectric element, or other small and lightweight speaker that is suitable for use under the conditions the mask wearer is likely to encounter (e.g., heat, if the mask is to be used in firefighting). An on/off switch 32 is provided to energize the amplifier.

Figure 20A:
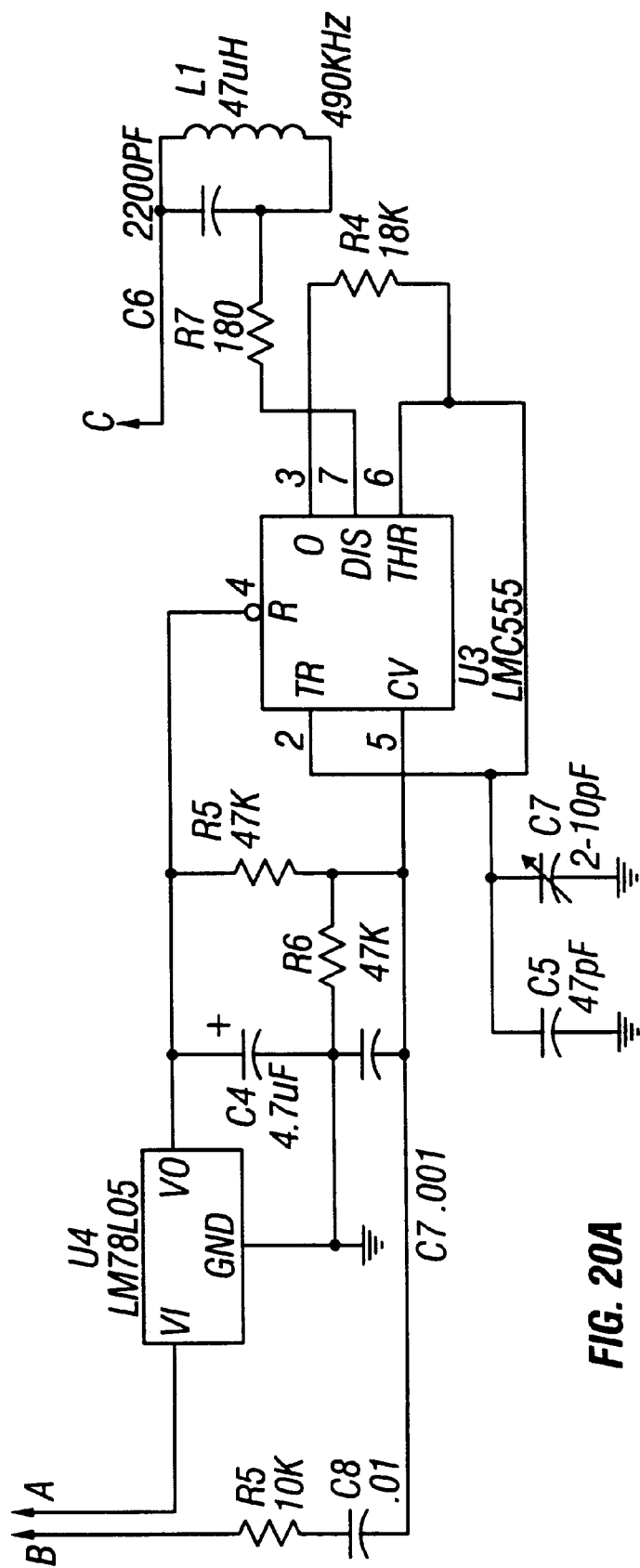
Figure 20B:
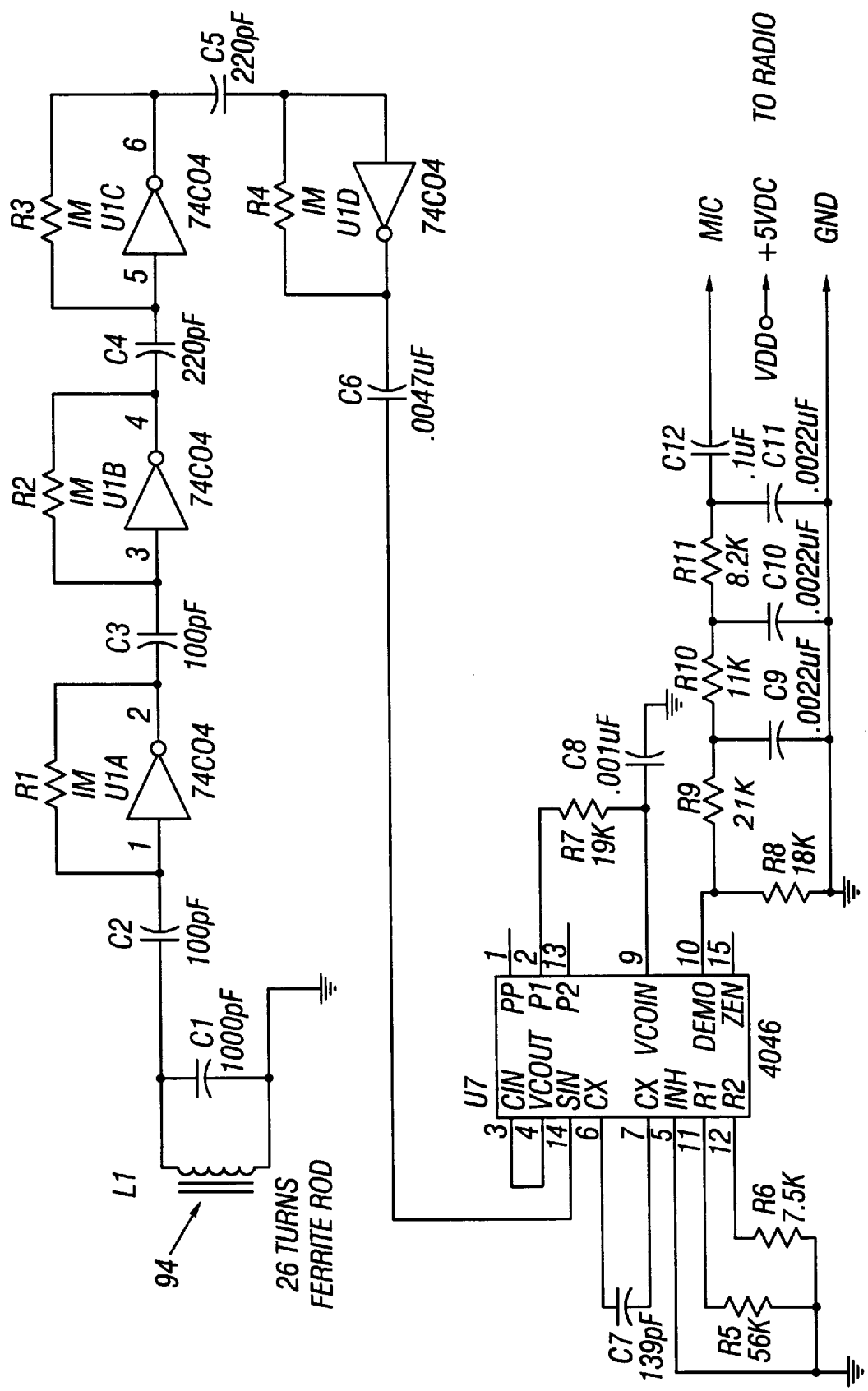

The transceiver 63 also includes radio link circuitry (FIG. 20A). The microphone's speech signals are coupled, via leads A,B,C, to the radio link circuitry, which in turn transmits, via an antenna, a corresponding radio signal 90 to the portable transceiver unit 11 and/or to transceiver 74 at the command post 70. In this manner, back-up or dual transmit functions are provided for enhanced safety. However, antenna 25 is designed to transmit the data signals 80–89, discussed below, and voice signal 90, to the command post 70.

A mounting piece 33 is provided for attaching unit 23 to the SCBA mask 10. Mounting piece 33 is round and has a concave surface that is adapted to be placed against the convex exterior surface of many standard SCBA masks. Referring to FIG. 15A, mounting piece 33 also includes an alcove 41 for receiving the power source 27, and a cantilevered neck portion 36 (FIG. 16) that extends through hole 37 in mask 10. The mounting piece 33 is secured to the mask 10 by screwing a retaining nut 35 onto the threaded portion of neck portion 36, which projects through opening 37 into the inside of the SCBA mask 10. The inner surface of nut 35 has a convex shape to fit the curved inner surface 43 of the SCBA mask 10. The mounting piece 33 may be formed of any suitable material, e.g., rubber or plastic. A relatively soft washer 34, e.g., of rubber, may be provided between the end portion 33 and the SCBA mask to accommodate slight curvature variations between masks and to absorb shock. Washer 34 also provides an airtight seal with nut 35.

The housing 30 may be secured to the mounting piece 33 by any suitable means, e.g., screw threads, as shown in FIG. 16 (male threads 64 secure to female threads 65 of housing 30), or quarter-turn bayonet type connectors.

Thus, the communication device 23 can be quickly mounted on the SCBA mask 10, and the housing 30 which contains the speaker, amplifier and receiver electronics can be readily removed and reattached to end portion 33. The communication device 23 may be quickly removed by hand by unscrewing nut 35, which has etched grooves 44 on its surface for improved grip. The communication device 23 can also be readily serviced by unscrewing and removing housing 30. Housing 30 may be constructed of any suitable material, e.g., plastic, and includes a threaded portion for easy removal.

Acoustic Mask-to-Mask Communication

The microphone 61, the amplifier electronics, and the speaker 62 allow the mask wearer to speak to other mask wearers and persons in close proximity to the mask wearer, using ordinary acoustical (non-radio) communication that is amplified so that it can be heard through the mask and over background noise.

Radio Mask-to-Remote Communication

The microphone 61, amplifier electronics, speaker 62, and transceiver 63 enable two-way communications via radio between the command post and the mask wearer. Communications are first transmitted from transceiver 63 to the portable transceiver 11 in radio 8 carried on the firefighter's belt, and then from transceiver 11 to the command post or other remote location.

Mask Wearer Protection and Accountability Systems

Both of the communication devices described above include a number of important safety features that allow the site commander to monitor the condition of mask wearers, as well as being able to pinpoint the location of a mask wearer who may be injured or in trouble.

Figure 10:
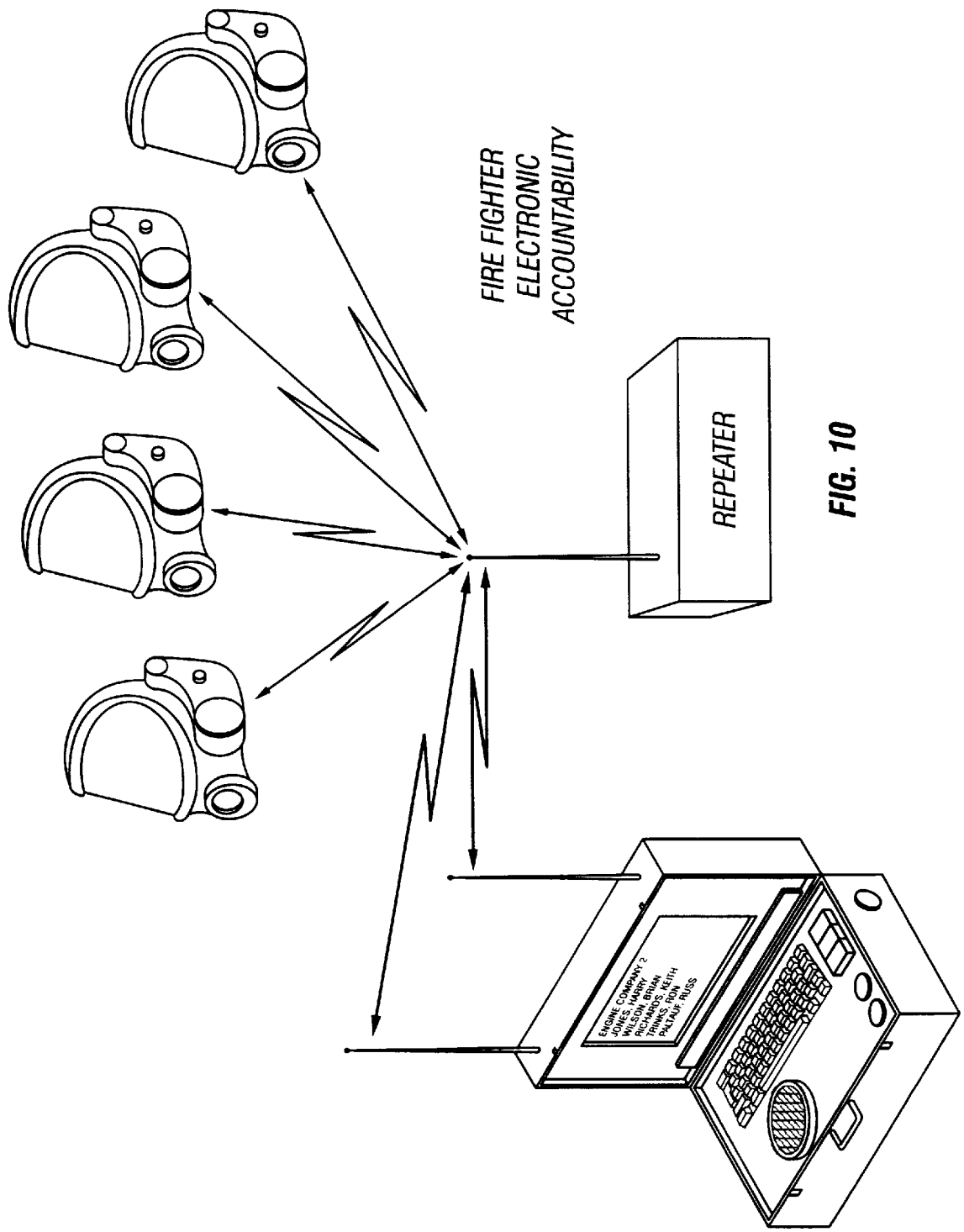
FIG. 10 is a schematic diagram showing communication between a plurality of communication devices and a command module.
Figure 17:
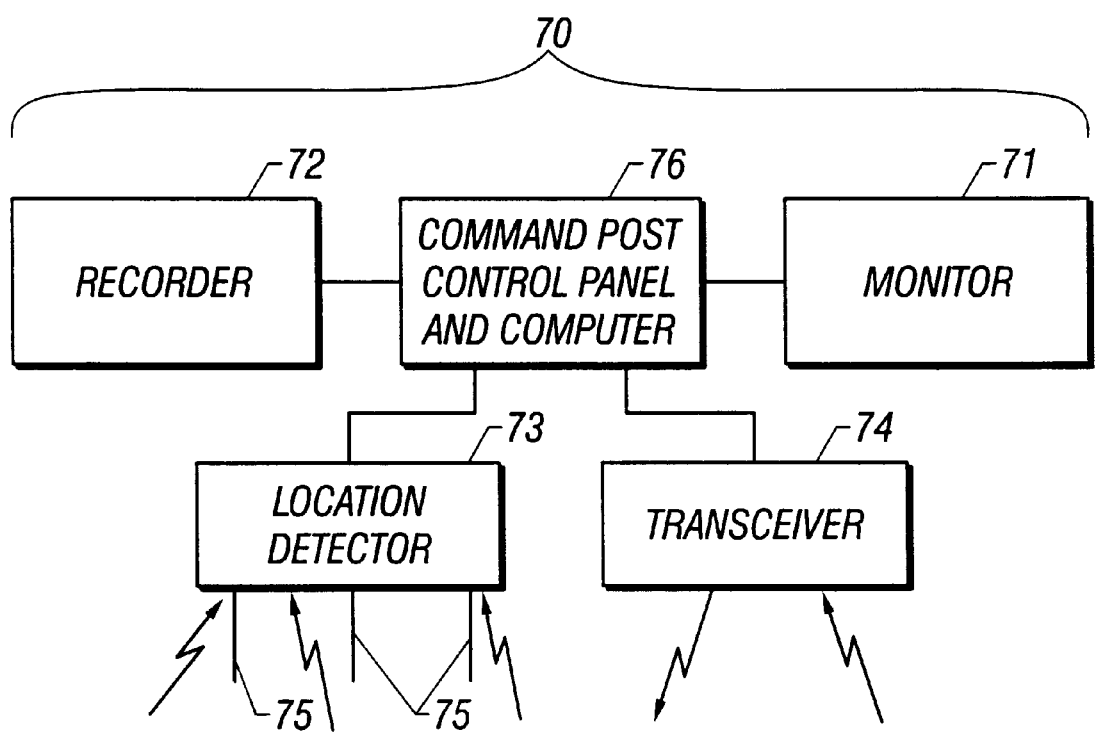
FIG. 17 is a block diagram of the logic for a command post module suitable for use with the communication device shown in FIG. 14.

As shown schematically in FIG. 10, communication devices 102 and 23 are monitored, respectively, by a command module (FIGS. 11–12a), and by a command post (FIG. 17). The command module or command post includes software and hardware that organizes data received from the communication devices of the mask wearers on the site, and presents this information in a user-friendly format to the site commander.

Figure 21:
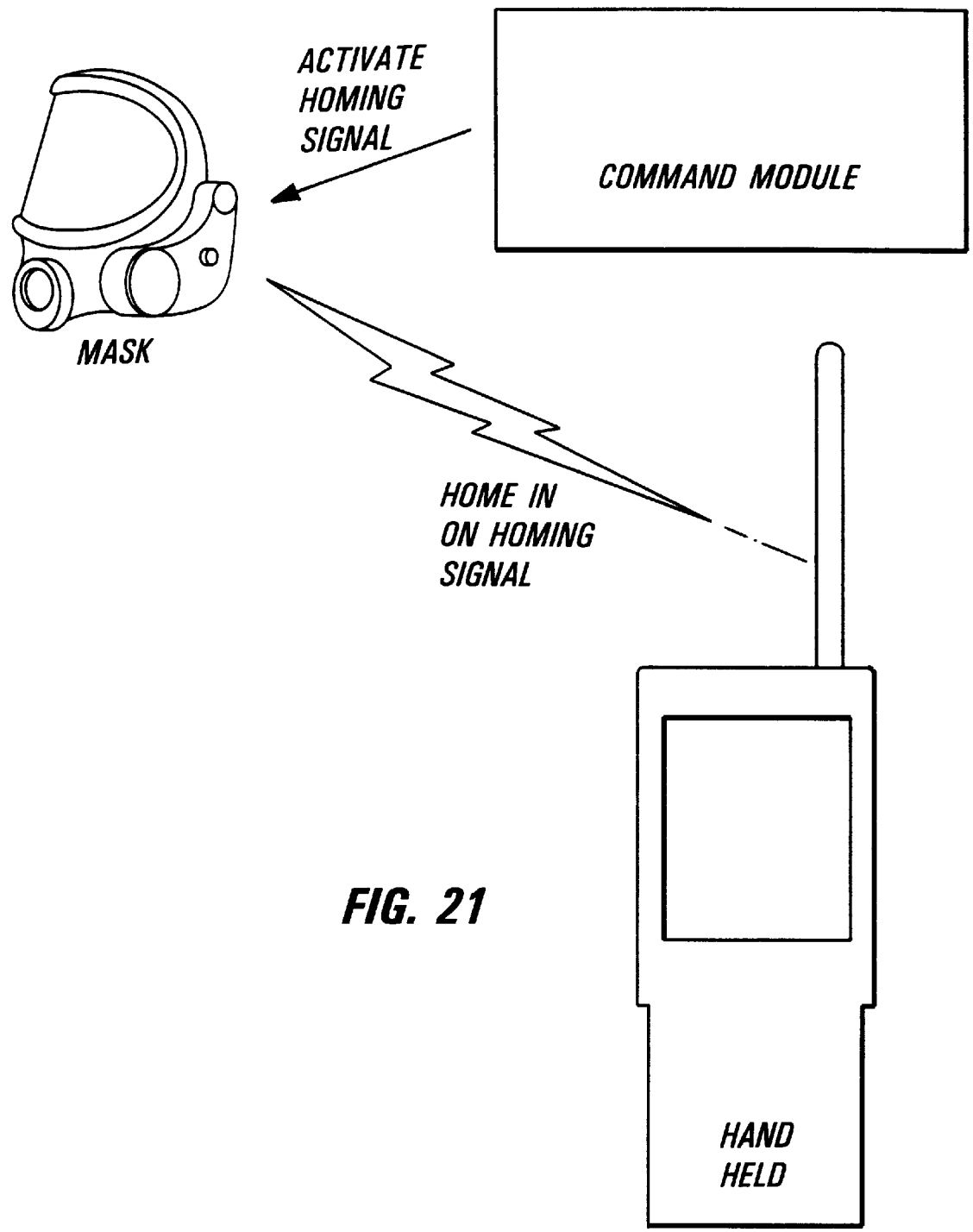
FIG. 21 is a schematic diagram if the use if the homing signal feature of the invention to find a mask wearer in trouble.

As shown in FIG. 21, the command module or command post also allows information about an incident to be collected and stored for future reference.

Figure 11:
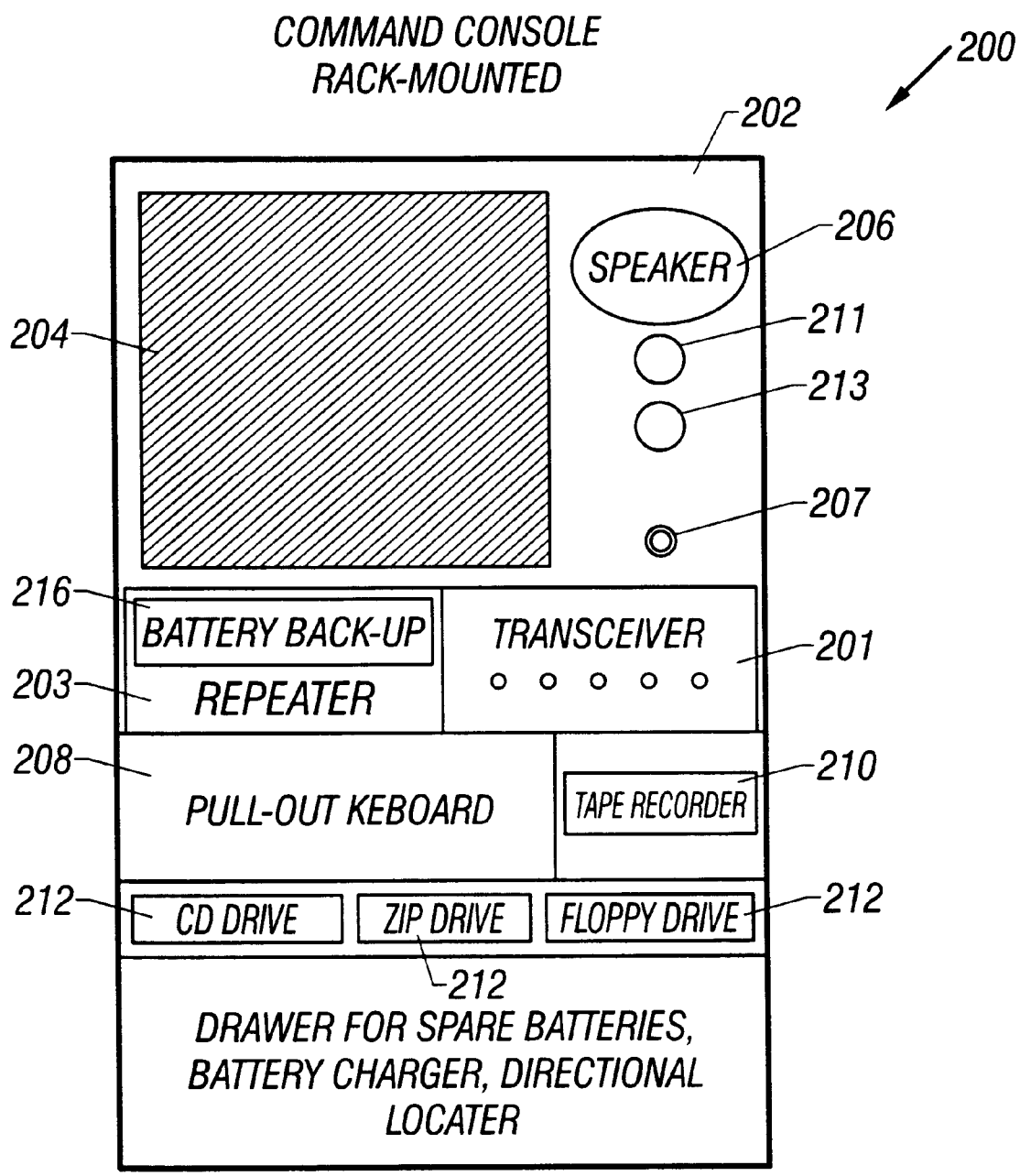
FIGS. 11 and 11a are, respectively, a diagrammatic front view of a rack-mounted command console, and a diagrammatic perspective view of a portable, folding command console.
Figure 11A:
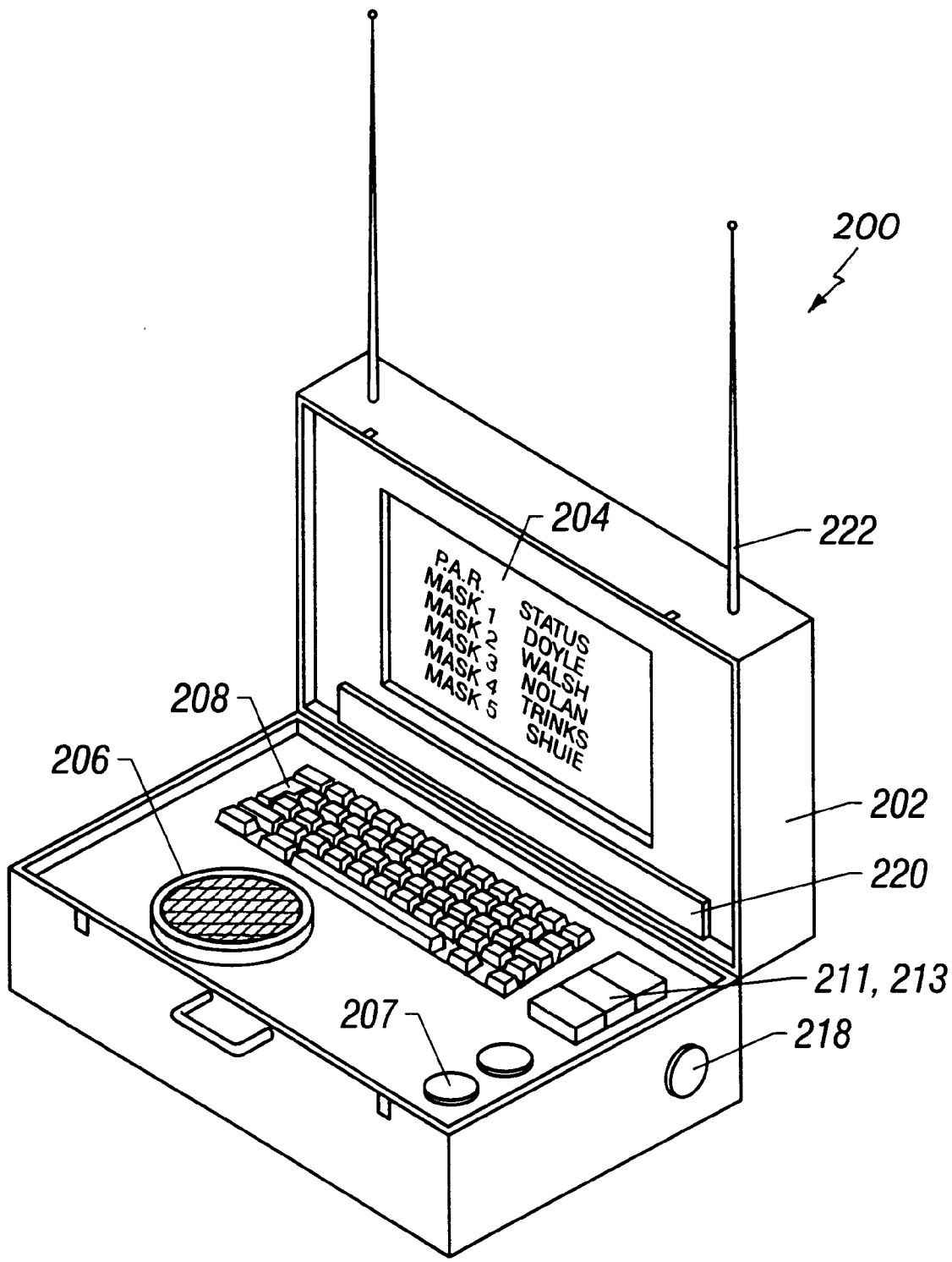

As shown in FIG. 21, the command module 200 shown in FIG. 11 is constructed to be mounted in a vehicle (e.g. a firetruck) or other fixed location, while the command module shown in FIG. 11A is adapted to be portable. In either case, the command module includes a transceiver 201 for receiving data from and a repeater 203 for sending data to the communication devices 102 (the transceiver and repeater are not shown in FIG. 13a), a housing 202, a monitor (display screen) 204, a speaker 206, and a microphone or microphone plug 207 to allow voice communication by command personnel with mask wearers. The monitor 204 is a visual display device (CRT) which is coupled to or includes a computer or microprocessor. The command module also includes a keyboard 208 to allow the site commander to enter and manipulate data and generate reports. In the rack-mounted version (FIG. 11) the keyboard is constructed to pull out of the module.

Emergency evacuation button 211 and polling button 213 are provided on the module to allow the commander to signal mask wearers, as will be described in further detail below The command module also includes a tape recorder 210 (not shown in FIG. 11a) for recording audio data, and various disc drives 212 (not shown in FIG. 11a) for recording and storing information as well as loading new software onto the module. Optionally, the rack-mounted module can include a drawer for storage, and/or a battery back-up 216 to prevent failure in the event of power loss. The portable module (FIG. 11a) also includes a battery charger 218 to charge its rechargeable battery power supply (not shown), an indigo light illuminating strip 220 to facilitate use in a dark area, and collapsible antennae 222. The portable module can optionally include a power cord and power plug-in (not shown).

The portable module is hinged to allow it to be folded up and easily carried. This is extremely advantageous when the incident site is difficult to communicate with from a distance, for example, a fire scene in a high rise building requiring a command post inside the building (rather than at a fire truck outside of the building).

The command module shown in FIGS. 11–11a performs a very important safety function, by periodically "polling" the mask wearers to make sure that they are capable of responding to a signal (and thus not in need of rescue or assistance). The command module is programmed to periodically send out a signal to each mask wearer, e.g., at predetermined time intervals and/or at a predetermined time after the last voice communication with the mask wearer. For example, mask wearers can be polled every 10 minutes automatically, and given 5 seconds to respond before computer goes to the next mask wearer. The signal will be a recognizable tone, word or phrase that will indicate to the mask wearer that he or she is being polled. At that time, the mask wearer, if conscious, will push the "push to talk" button to respond to the poll. Preferably, the command module is programmed to retry unresponsive mask wearers one or more times before alerting the site command personnel of the need for a rescue. The program also can provide for manual intervention, e.g., more frequent polling or polling of a particular mask wearer, by command personnel. As discussed above with reference to FIG. 8, the command module has the capability to send a signal to selected masks or to all of the masks by including a group ID or unique ID in the signal sent.

Examples of information that can be displayed on the command module monitor screen are shown in FIGS. 12–12A. In FIG. 12, the monitor displays a list of firefighters present in a fire site (i.e., a list of mask wearers with masks turned on). The name of the mask wearer who is currently talking to the site commander is indicated, e.g., by a circle next to name or by the name being highlighted. The display also shows the time that the firefighter entered the scene ("Time In") and the elapsed time ("Mask On"). The time numbers will change color depending on how long each mask has been on. For example, the numbers turn yellow after 20 minutes (to indicate that the firefighter's air is running low), and turn red at 40 minutes (to indicate that although the air bottle would have been replaced, the firefighter would be exhausted). The firefighters' names change color depending on how long it has been since each firefighter last transmitted to the command module. For example, each time the firefighter transmits, his or her name turns green. If a firefighter is polled, as discussed above, and does not respond after the second time, the firefighter's name turns yellow. If the firefighter does not respond after being polled third time, the firefighter's name turns red and an alarm goes off.

As shown in FIG. 12A, other display screens can be provided, for example to allow entry of notes by the site commander, allowing the commander to more easily generate a report of the incident at a later time.

The command module can also transmit a signal to the communication device of a mask wearer who is suspected to be in trouble, activating transmission of a homing signal by the communication device. Other personnel at the incident can then locate the mask wearer using hand-held receivers adapted to home in on a homing signal, as is well known in the rescue and emergency fields.

If the site commander determines that the site should be evacuated, or, optionally, if the command module is adapted to detect a hazardous condition and make this determination automatically, the command module will transmit an evacuation signal to all mask wearers.

Like command module 200, command post 70 (FIG. 17) includes an operator control panel 76, a monitor 71, a recorder 72 and a transceiver 74. Command post 70 further includes a location detector 73. Command post 70 may be within a fire vehicle. The control panel 76 includes controls to enable the command post operator to voice communicate, via transceiver 74, with each firefighter individually, or with a group of firefighters collectively. The recorder 72 may include a standard type video and/or audio recorder, to document the communication, location and data received from mask wearers on a time scale and provide a record of events for later review.

Monitor 71 is coupled to location detector 73. Location detector 73 includes a pair of spaced antennae 75 that receive a location signal 85 (preferably periodic encoded digital pulses) that is transmitted from the communication device 23. Triangulation of the location signals for each mask wearer is performed by the location detector 73, and a resulting location marker is displayed on monitor 71. Triangulation and monitor display technology are well known in the art and thus will not be discussed in detail.

Figure 18:
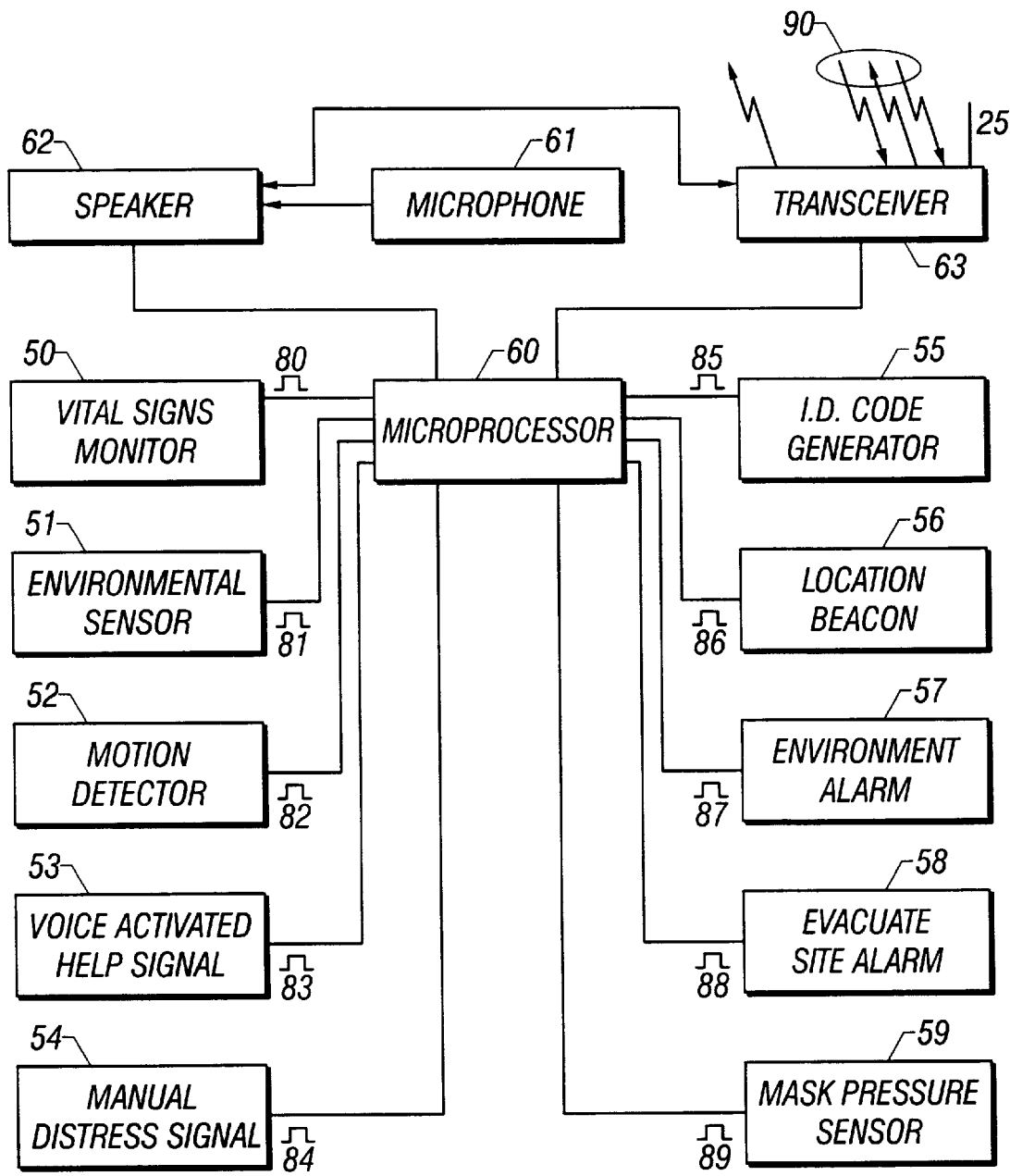
FIG. 18 is a block diagram of the logic for the communication device shown in FIG. 14.
Figure 19:
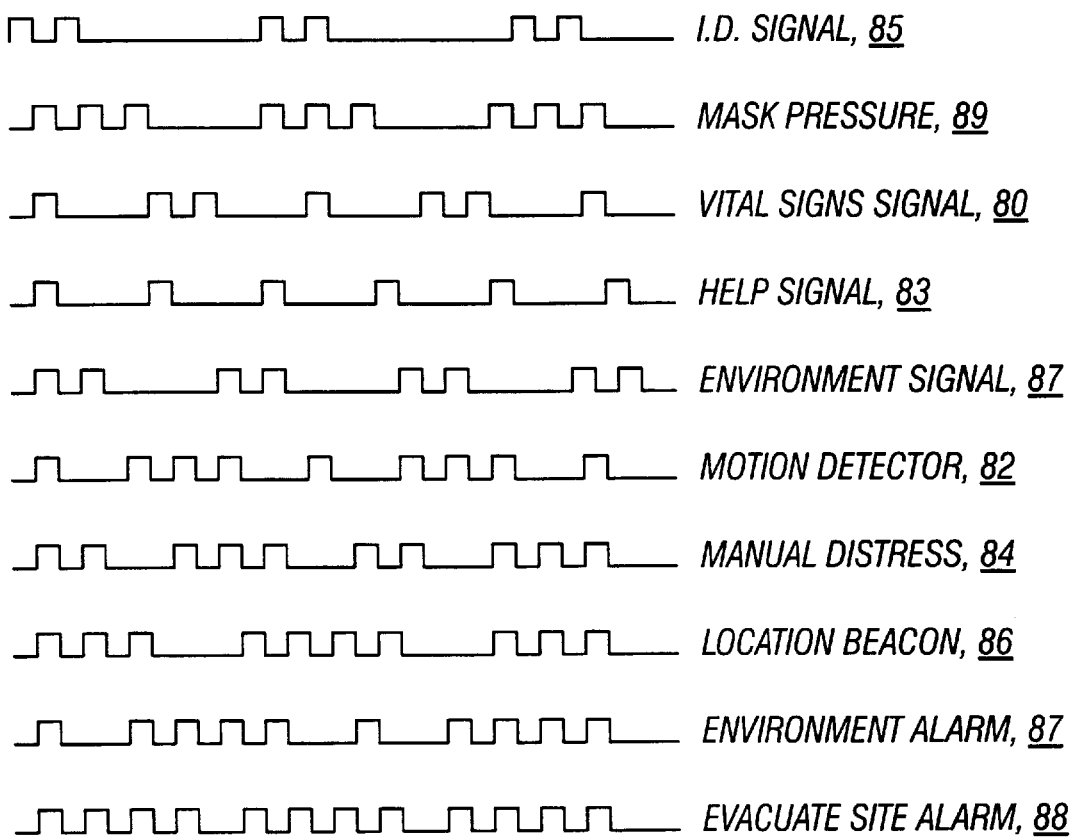
FIG. 19 is a drawing of different waveforms for controlling various functions.

As noted above, communication device 23 includes an integrated electronics package 28, having circuitry and programming components corresponding to the logic diagram shown in FIG. 18. The electronics package 28 includes a number of components selected to provide safety features: a vital signs monitor 50, an environment sensor 51, a motion detector 52, a voice activated distress monitor 53, a manually activated distress signal 54, an identification code generator 55, an evacuation alarm 58, a mask pressure sensor/alarm 59, and a transceiver 63. The vital signs monitor may include a sensor for determining whether the mask wearer is breathing. The communication device may also include a temperature sensor, to monitor the temperature outside the mask and send a signal to command if a dangerous temperature is detected. The mask pressure sensor can be constructed to send a signal to command if a change in pressure is detected that would indicate that the mask wearer has removed his or her mask. The communication device can also signal command if the battery life of an active communication device is reaching its limit. These components are conventional and readily available, and thus will not be discussed in detail herein.

Transceiver 63, under the control of microprocessor 60, periodically causes the transmission of the location signal 85, a mask air pressure signal 86, and a vital signs signal 87. These signals are received by the transceiver 74 and location detector 73, for monitoring by the command post personnel. The location signal code generator 55 provides the location signal 85 which is gated or switched under microprocessor 60's control to transceiver 63, which in turn is transmitted to transceiver 74.

A pulse rate detector 77 (FIGS. 15 and 16) is provided for monitoring the mask wearer's pulse rate and transmitting this data, via vital signs monitor 50, to the command unit 70. The pulse rate detector 77 includes an ear lobe clip 78 that is clipped to the mask wearer's ear lobe or other pulse point. Pulse rate detector 77 is coupled, via lead 70, to the vital signs monitor circuitry 50. An air pressure detector 59 is mounted to neck portion 36 and is coupled, via lead 92, to the pressure sensor/alarm 59.

Environmental sensor 51 includes a sensing head 15 mounted on the outer surface of housing 30 for detecting the presence of toxic gases and/or dangerous hydrocarbon levels outside the mask. Environmental sensor 51 generates a signal 81 (FIG. 19) indicative of the air conditions and, via microprocessor 60 and transceiver 63, transmits this data to the command post 70. Microprocessor 60 also causes speaker 62 to emit a series of beeps or other identifiable audible signal indicative of a hazardous condition.

Microprocessor 60 is programmed to detect a verbal request for help, and, in response, to transmit a distress signal 83 (FIG. 19), via transceiver 63 and signal transmitter 25, to the command post 70. This distress signal will then indicate to the command post that the mask wearer requires assistance. The mask wearer may also request help by activation of a manual help switch 93 located on the communication device 23, causing distress signal 83 to be sent to the command post.

A motion detector 52 is mounted with the audio amplifier/ electronics 28 (see FIG. 16), to detect when the mask wearer is motionless for a predetermined period, and therefore may be unconscious and in need of help. Motion detector 52 is a solid state accelerometer, commercially available for use in firefighting equipment. Motion detector 52 is connected, via microprocessor 60 and transceiver 63, to the command post 70, and will send a distress signal when the motionless condition is detected.

The command post 70 includes a programmed microprocessor for signalling an alarm, e.g., on the monitor, when a distress signal is received due to a help or motionless condition. Also, the microprocessor 60 activates a location beacon 56, e.g., a flashing light, mounted on housing 30, and/or a series of audible signals from speaker 62, to assist rescuers in locating the mask wearer.

The evacuate site alarm 58 directs the mask wearer to evacuate the area. The command post 70, via transceivers 74 and 63, may activate the evacuate site alarm 58 on all of the masks that are in the area to be evacuated, causing speaker 62 to emit an audible signal and/or light beacon 56 to display a visual signal.

The safety features described above with reference to command post 70 can also be included in communication device 102.

Other embodiments are within the claims.

For example, while examples of preferred housings have been shown in the figures and described above, the communication device can be housed in any desired type of housing. Moreover, the features described above for the alternative embodiments of the invention can be combined in any desired manner.

The communication devices may also include a data port to allow software to be loaded into the communication device. This allows the communication device to be readily upgraded as new software features become available.

What is claimed is:

1. A protective mask communication device for use in hazardous environments, with a protective mask that is adapted to be worn over a person's face and to supply air to the wearer, comprising:

a housing construction to be mounted on the protective mask, and, disposed within the housing, a microphone, in acoustic communication with the interior of the mask, and a speaker, in acoustic communication with the wearer's ear, a transceiver constructed to transmit and receive relatively low power signals to and from another similar communication device located nearby, and to transmit and receive relatively higher power signals to and from a remote transceiver located relatively further away than said similar communication device, and circuitry constructed to process the signal received from the microphone and supply an input signal to the transceiver.

2. The device of claim 1 further comprising:

an actuator, external to the housing, constructed to be manually actuated by the mask wearer, and within the housing, circuitry constructed to cause (a) the mask power to be turned on if the actuator is actuated when the power is off; and, each time that the actuator is actuated when the power is on: (b) an identification signal to be sent to the remote transceiver, identifying the mask wearer, and (c) the transmission of said relatively higher power signals to be activated.

3. The device of claim 2 wherein said actuator is a single button extending above an outer surface of the housing.

4. The device of claim 1 wherein the relatively higher power signals are transmitted to a repeater and then retransmitted by the repeater to the remote transceiver.

5. The device of claim 1 wherein the relatively low power and relatively higher power signals are transmitted on different channels.

6. The device of claim 1 wherein transmission of said relatively low power signals is voice activated and transmission of said relatively higher power signals is manually activated.

7. The device of claim 6 wherein manual activation causes an identification signal to be sent to the remote transceiver, identifying the mask wearer.

8. The device of claim 6 wherein said communication device further comprises an actuator constructed to be moved by the mask wearer to manually activate the transmission of said relatively higher power signals, and wherein said actuator also is constructed to turn on the power to the communication device.

9. The device of claim 8 wherein turning the power on causes an identification signal to be sent to the remote transceiver, identifying the mask wearer.

10. The device of claim 1 wherein said housing includes a mounting device for mounting the communication device to the mask at two points, so that the communication device cannot readily rotate with respect to the mask.

11. The device of claim 1 wherein said housing includes a mounting device for mounting the communication device to the mask and said mounting device includes a flange positioned to engage and exposed area of the mask frame.

12. The device of claim 1 wherein said housing includes a mounting device for mounting the communication device to the mask and said mounting device includes a clamp for securing the communication device to a voicemitter extending from the mask.

13. The device of claim 12 wherein said clamp includes a camming lever to allow a user to quickly release the clamp from the voicemitter.

14. A protective mask communication device for use in hazardous environments with a protective mask that is adapted to be worn over a person's face and to supply air to the wearer, comprising:

a housing construction to be mounted on the protective mask, and, disposed within the housing, a microphone in acoustic communication with the interior of the mask, a speaker to provide short-range acoustic communication between the mask wearer and person'a in the vicinity of the mask wearer, a transceiver to provide wireless radio frequency communication between the mask wearer and a remote receiver, and circuitry constructed to process the signal receive from the microphone and supply input signal to the transceiver and speaker wherein said transceiver is constructed to transmit and receive both data and communication signals.

15. The device of claim 14 wherein said signals include a location signal transmitted from the communication device at predetermined intervals to assist in locating the mask wearer.

16. The device of claim 14 wherein said data signals include an evacuation signal transmitted to the communication device from the remote receiver.

17. A protective mask communication system for use in hazardous environments, with a protective mask constructed to be worn over a person's face and to supply air to the wearer, comprising:

a communication device mounted on the protective mask, including a transceiver to provide wireless radio frequency communication of data and communication signals between the mask wearer and a remote receiver; and a command module including a polling device for sending a polling signal to the wearer and receiving a response to the polling signal from the wearer.

18. The system of claim 17 wherein the transceiver is constructed to transmit and receive relatively low power signals from another similar communication device located nearby, and to transmit the data and communication signals to and from the remote receiver at a relatively higher power.

19. The system of claim 18 wherein the relatively low power and relatively higher power signals are transmitted on different channels.

20. The system of claim 18 wherein the communication device includes an actuator constructed to be moved by the mask wearer to manually activate the transmission of the relatively higher power signals.

21. The system of claim 20 wherein the command module is constructed to recognize the manual activation as a response to the polling signal or, if no polling signal has been sent, as an indication that the mask wearer is conscious.

22. The system of claim 17 wherein said polling device is adapted to send one or more further polling signals if no response is received, and to provide an alarm signal to the command module if no response is received after said further polling signals.

23. The system of claim 22 wherein the system includes a plurality of communication devices, the command module includes a visual display listing the names of the wearers of the communication devices, and said alarm signal includes a change in the color of the name of the mask wearer.

24. The system of claim 17 wherein said polling device is adapted to determine the length of time elapsed since said polling signal was sent, and to send a further polling signal if no response has been received from the wearer after a predetermined period of time has elapsed.

25. The system of claim 17 wherein said command module is constructed to track the time elapsed since the communication device was turned on, and provide a visual display of the elapsed time.

26. The system of claim 25 wherein the system includes a plurality of communication devices, and the visual display includes a list of the names of wearers of the communication devices.

27. The system of claim 26 wherein the command module is further adapted to provide an alarm if a communication device has been turned on for longer than a predetermined time.

28. The system of claim 27 wherein the alarm is a change in the appearance of information on the visual display regarding the wearer of the communication device.

29. The system of claim 28 wherein the change is a color change.

30. The system of claim 17 wherein the data signals sent by the communication device, and received by the command module, include data pertaining to the mask wearer's physical condition.

31. The system of claim 17 wherein the command module is constructed to transmit an evacuation signal to the communication device.

32. The system of claim 17 wherein the command module is constructed to remotely activate a homing signal to be transmitted by the communication device to assist in locating the wearer of the communication device.

33. The system of claim 32 further including a hand-held receiver to be used to track the homing signal and locate the wearer.

34. The system of claim 17 wherein the communication device is constructed to send, and the command module to receive, a "man down" signal when the wearer of the communication device manually actuates an actuator external to the communication device.

35. A protective mask communication system for use in firefighting comprising
   a mask constructed to supply air to the wearer and adapted for use inside a fire scene; and
   a communication device mounted on the mask including a transceiver constructed to transmit and receive signals from another similar communication device wherein said communication device further comprises a speaker and a microphone connected to said transceiver, the speaker, transceiver and microphone being contained in a housing as a single unit wherein said communication device further comprises a speaker positioned adjacent the mask wearer's ear.

36. The system of claim 35 wherein the communication device further comprises a clamp for securing the device to the mask, including a mounting ring and a camming lever for moving the mounting ring between open and closed positions.

37. A protective mask communication system for use in hazardous environments with a protective mask constructed to be worn over a person's face and to supply air to the wearer, comprising
   a communication device mounted on the protective mask, including a transceiver to transmit and receive relatively low power signals from another similar communication device, and to provide wireless radio frequency communication, at a relatively higher power, of data and communication signals between the mask wearer device and a remote receiver, and
   a command module for communication of data and communication signals to and from the communication device at the relatively higher power.

38. The system of claim 37 wherein the communication device is constructed to send, and the command module is constructed to receive, a data signal indicating a parameter selected from the group consisting of: the temperature outside the mask, the pressure within the mask, the breathing sounds within the mask, motion of the wearer of the communication device, the remaining battery life of the communication device, and the vital signs of the mask wearer.

* * * * *

UNITED STATES PATENT AND TRADEMARK OFFICE
CERTIFICATE OF CORRECTION

PATENT NO. : 6,121,881
DATED : September 19, 2000
INVENTOR(S) : John S. Bieback and Peter J. LaPlaca It is certified that error appears in the above-identified patent and that said Letters Patent is hereby corrected as shown below:

Title page,
Item [75] Inventors: delete "Fred Pulver, Northport, NY".

Figure 9:
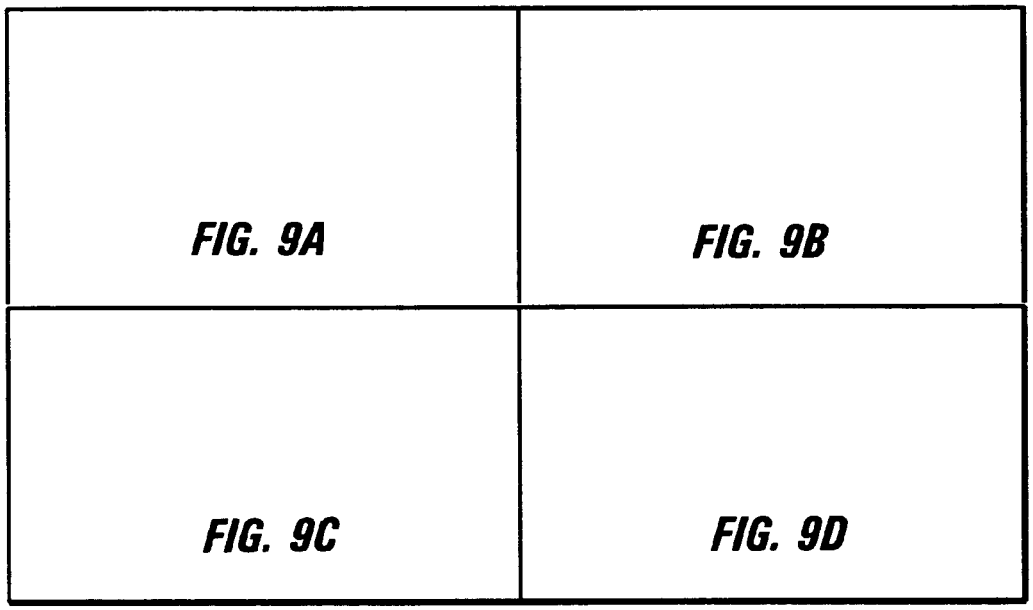
FIG. 9 is a circuit diagram showing suitable circuitry for use in the communication device of FIG. 1.
Figure 9A:
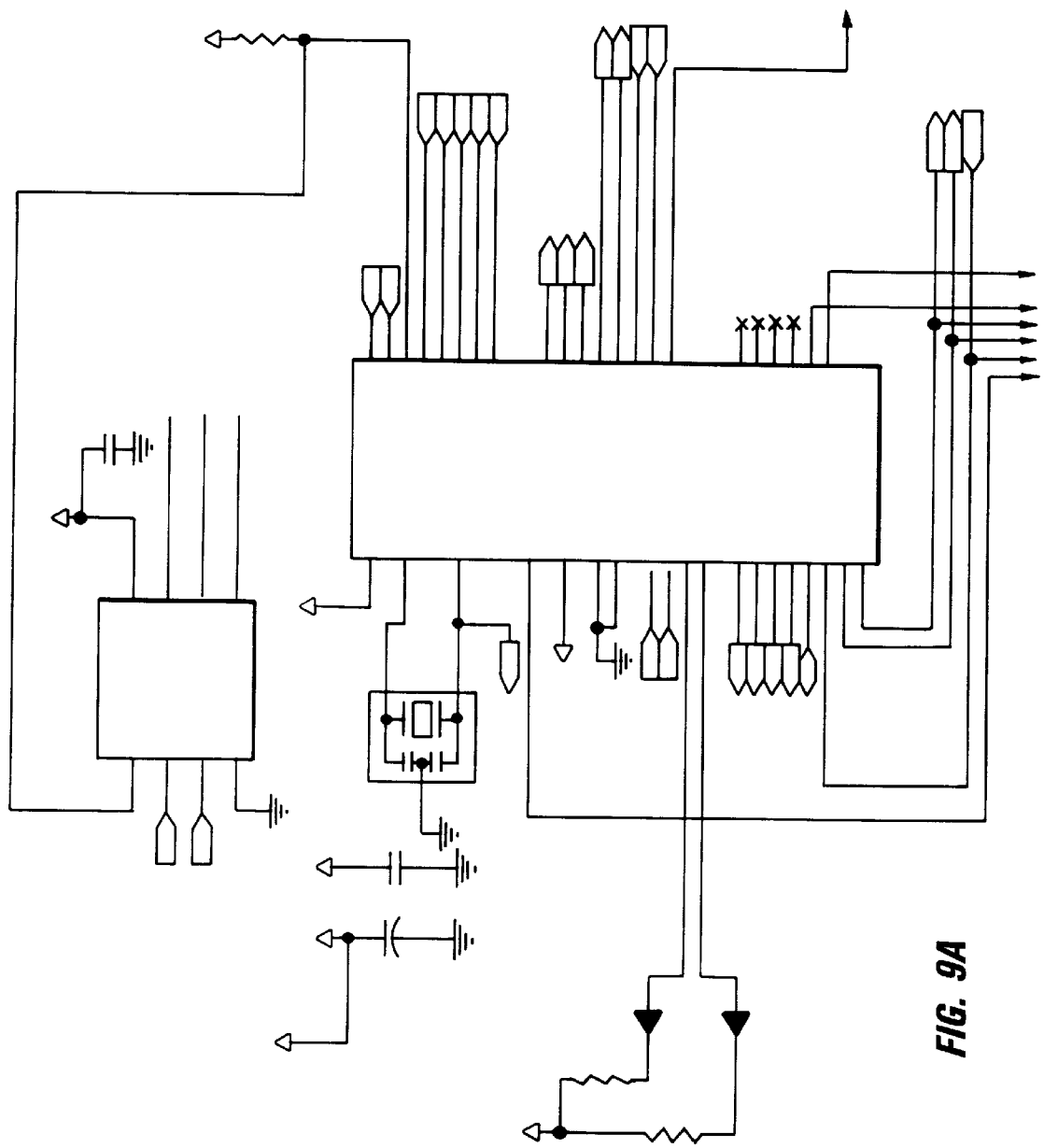
Figure 9B:
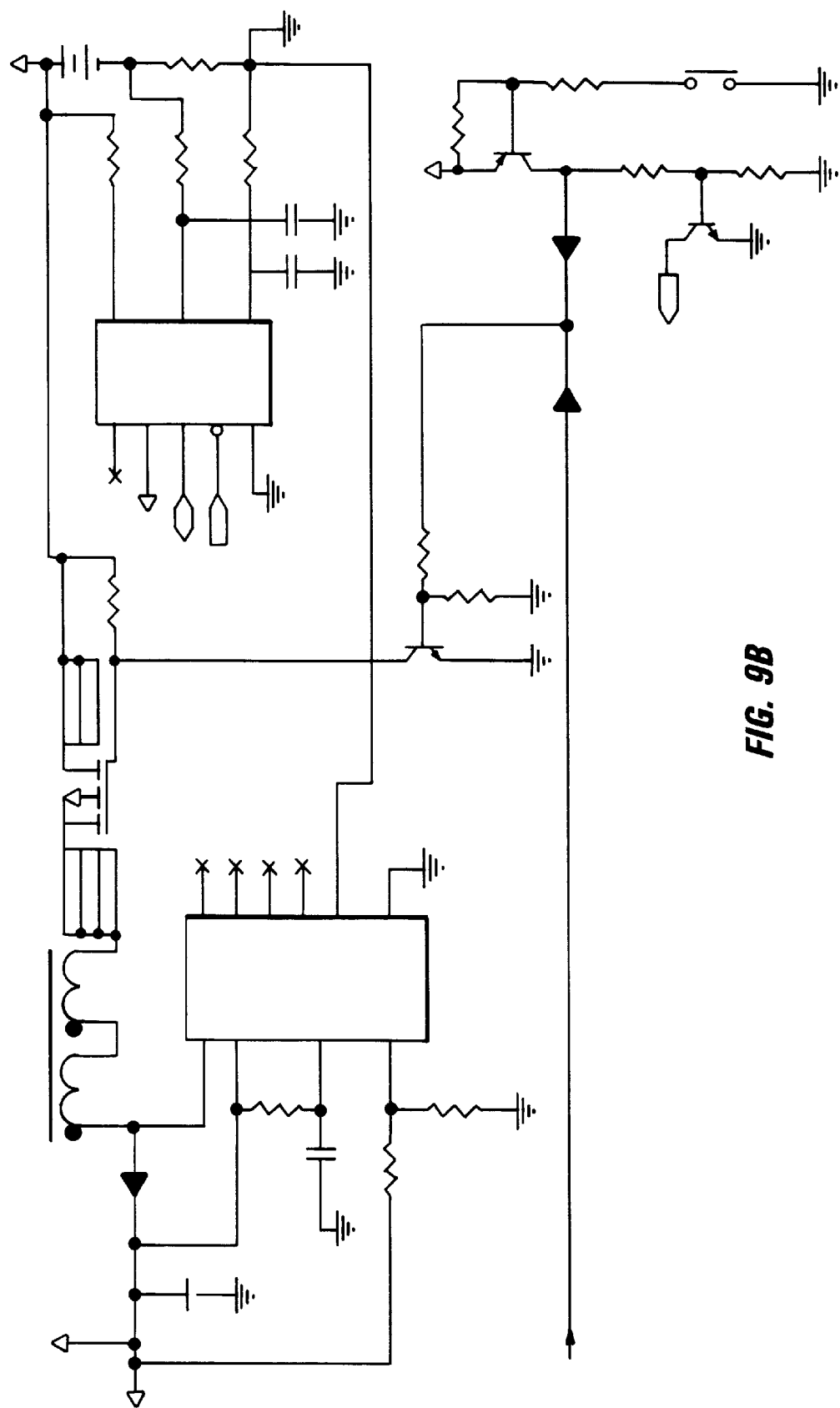
Figure 9C:
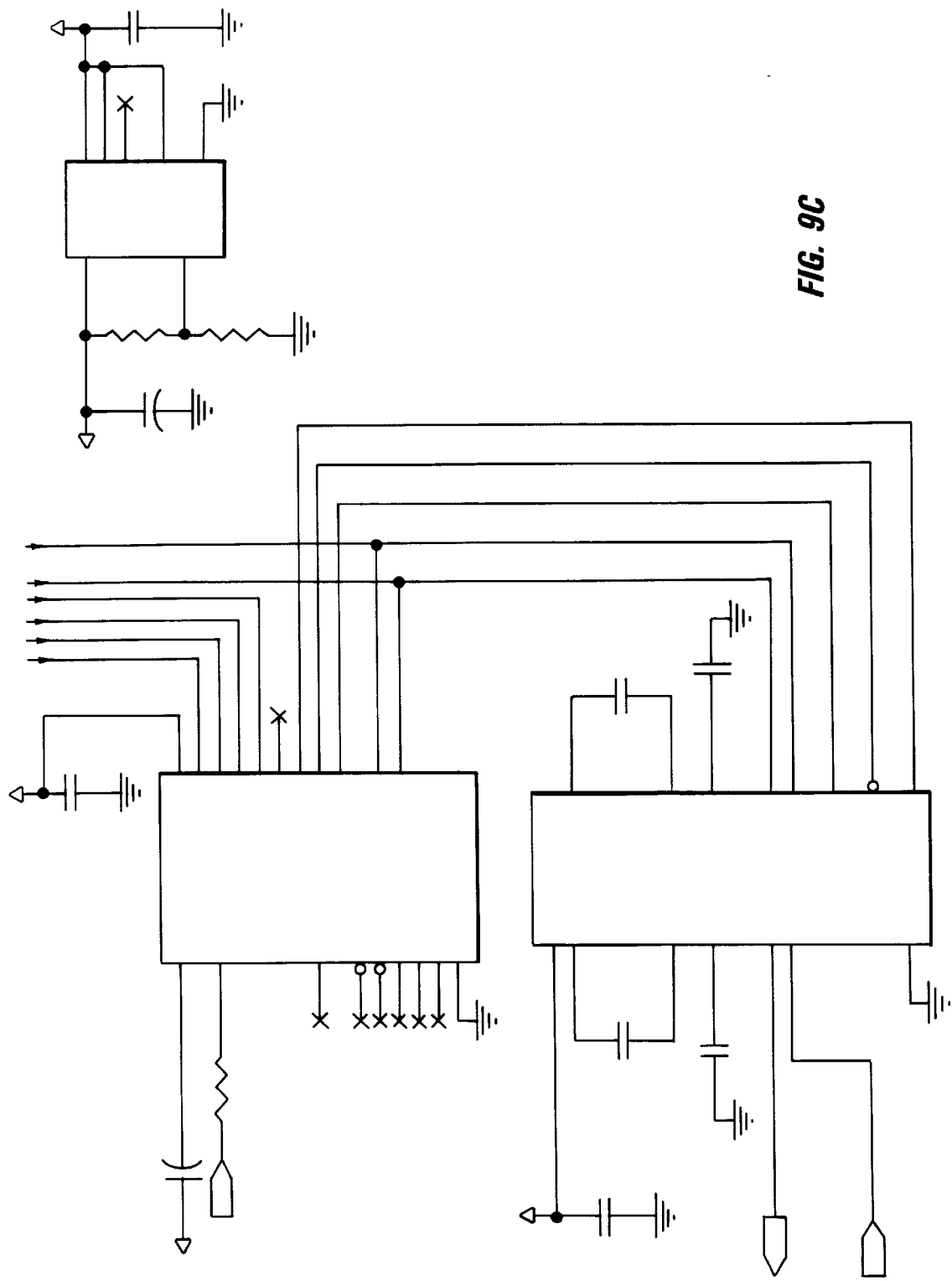
Figure 9D:
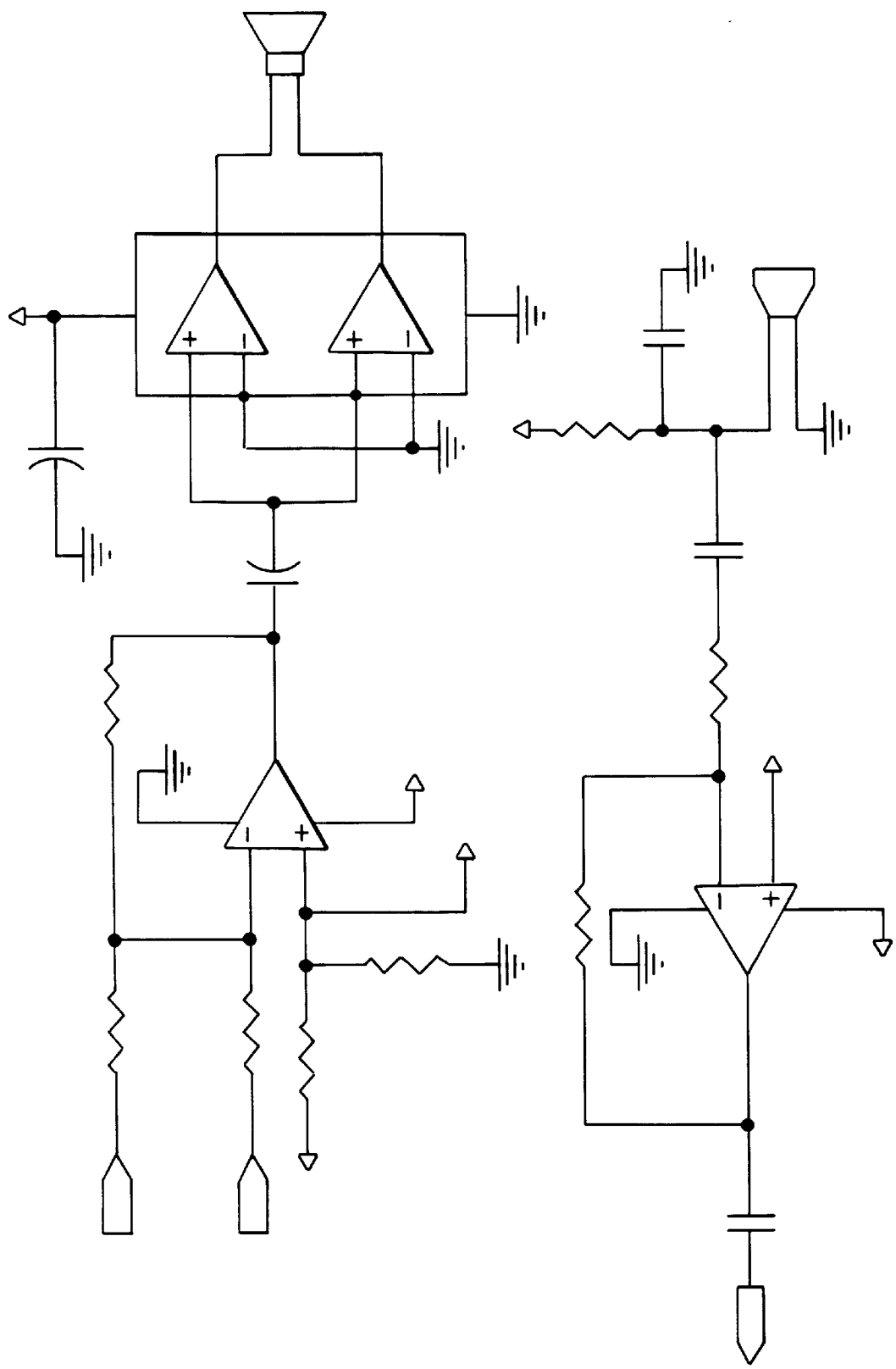

Column 4,
Line 51, "FIG. 9 is" should be -- FIGS. 9, 9A, 9B, 9C, and 9D are --.

Column 5,
Line 17, "if" should be -- of --.
Line 36, after "scene", insert a period.

Column 6,
Line 10, after "pin", delete "118".

Column 9,
Line 65, delete "As shown in FIG. 21,".

Column 10,
Line 1, delete "As shown in FIG. 21, the".

Column 11,
Line 24, delete "The" and insert -- As shown in FIG. 21, the --.

Column 14,
Line 27, "communication" should be -- communications --.
Line 28, "person'a" should be -- person's --.
Line 33, "receive" should be -- received --.
Line 34, "signal" should be -- signals --.

Signed and Sealed this

Twenty-third Day of October, 2001

*Attest:*

NICHOLAS P. GODICI
*Attesting Officer*    *Acting Director of the United States Patent and Trademark Office*